(12) United States Patent
Leonard et al.

(10) Patent No.: US 6,507,828 B1
(45) Date of Patent: Jan. 14, 2003

(54) NEURON CIRCUIT AND RELATED TECHNIQUES

(76) Inventors: Jason Leonard, Rte. 1, Box 217, Micanopy, FL (US) 32667; Chi-Sang Poon, 39 Grapevine Ave., Lexington, MA (US) 02173

( * ) Notice: Subject to any disclaimer, the term of this patent is extended or adjusted under 35 U.S.C. 154(b) by 0 days.

(21) Appl. No.: 09/332,790

(22) Filed: Jun. 14, 1999

Related U.S. Application Data

(60) Provisional application No. 60/090,069, filed on Jun. 19, 1998.

(51) Int. Cl.[7] ................................................ G06F 15/18
(52) U.S. Cl. .............................. 706/33; 706/34; 706/41; 706/25
(58) Field of Search .............................. 706/33, 34, 41, 706/25

(56) References Cited

U.S. PATENT DOCUMENTS 5,592,589 A * 1/1997 Poon ............................. 706/25

* cited by examiner

*Primary Examiner*—George B. Davis
(74) *Attorney, Agent, or Firm*—Daly, Crowley & Mofford, LLP

(57) ABSTRACT

A neuron circuit including means for synaptic modification is described. The circuit emulates the electrical behaviors of the neuron membrane, dendrite, and synapse, using principles based on the actual biology. In one embodiment, the circuit is implemented as an analog very large scale integrated (VLSI) circuit which utilizes CMOS integrated circuit technology. The analog VLSI circuit includes a synapse circuit having a circuit portion which models a mechanism for the modification of the synaptic conductance.

14 Claims, 16 Drawing Sheets

NEURON CIRCUIT AND RELATED TECHNIQUES

RELATED APPLICATIONS

This application claims priority under 35 U.S.C. §119(e) from application No. 60/090,069 filed Jun. 19, 1998 which application is hereby incorporated herein by reference in its entirety.

GOVERNMENT RIGHTS

This invention was made with government support under Grant Numbers N00014-95-1-0414, N00014-95-1-0863, and N00014-96-1-1030 awarded by the Department of the Navy. The government has certain rights in the invention.

FIELD OF THE INVENTION

This invention relates generally to neural networks and more particularly to circuits which model the behavior of biological neurons.

BACKGROUND OF THE INVENTION

As is known in the art, there exists a class of networks referred to as neural networks which model the behavior of certain human functions. Electronic neural networks have been used to implement mathematical or engineering abstractions of biological neurons. Circuits emulating biological neurons are typically implemented using digital circuits that operate up to a million times faster than actual neurons or with software which simulates the behavior of a biological neuron. One problem with the digital circuit approach, however is that it does not utilize life-like principles of neural computation. Furthermore, a biological nervous system contains thousands or millions of interconnected neurons and thus the complexity of a biological nervous system results in a complex digital circuit.

Similarly, given the complexity of the biological systems, software simulations can take many hours or days even using presently available state-of the-art processing systems. Thus software systems are not appropriate for use in applications which require real time or close to real time performance from such systems An electronic circuit that emulates the analog behavior of actual biological neurons, on the other hand, can perform simulations in real time. Thus, to overcome the above limitations with systems implemented using digital circuits or software, electronic circuit neural networks which use principles of neural computation which are more life-like than the digital circuit or software approaches have been developed.

This type of neural network interacts with real-world events in a manner which is the same as or similar to biological nervous systems and can be utilized in a variety of systems including but not limited to electronic and electromechanical systems, such as artificial vision devices and robotic arms. Such neural networks can also be used as research tools to better understand how biological neural networks communicate and learn.

Much of the effort directed toward producing electronic implementations of biological neurons have focused on emulating the input-output functional characteristics of the neuron, essentially treating the neuron as an abstracted black box. These implementations focus on circuits and techniques for generating an action potential in an attempt to simulate the actions neurons take to communicate with one another. One problem with past approaches, however, is that such approaches fail to properly take into account or model the means which actually produces the action potential in a biological neuron.

Some prior art techniques have produced analog integrated circuits that mimic the functional characteristics of real neuron cells, by isomorphically emulating the membrane conductances within an actual neuron cell body. Thus, one problem with prior art approaches is that they fail to include circuitry for the synapse through which neurons communicate and/or the prior art approaches fail to include circuitry for the dendrite which is the connection between the synapse and neuron cell body. Prior art systems also fail to include effective circuitry to implement the adaptation or learning functions of real neurons.

In one particular prior art technique, a model of one type of synapse referred to as a Hebbian Synapse was provided. In a Hebbian Synapse, stimulation of the pre-synaptic neuron causes the release of neurotransmitters from an axon terminal. These transmitters include amino acid glutamate and bind to corresponding receptors on the post-synaptic membrane causing ion channels to open up through these receptors. Glutamate binds to three types of receptors: N-methyl-D-aspartate (NMDA), quisqualate, and kainate. Long Term Potentiation (LTP) and Long Term Depression (LTD) are both mediated by the NMDA receptors, which carry primarily $Ca^{2+}$ currents. The other receptors, termed the non-NMDA receptors, carry the remainder of the synaptic current, consisting mainly of $Na^+$, with negligible $Ca^{2+}$ content. These receptors are located on a spine head connected to the dendritic shaft.

The spine head can be represented or modeled as an electrical circuit which includes four parallel circuit legs. The total synaptic current consists of the sum of the NMDA and non-NMDA currents. There also exists a small leakage conductance and the capacitance that represents the membrane capacitance of the spine head. The current through the non-NMDA channels in response to a pre-synaptic stimulus is given by an alpha function:

$$I_{non}=(E_{non}-V_{head})\kappa g_p t e^{t/p1} \qquad \text{Equation 1}$$

in which $K=e/t_p$, e is the base of the natural logarithm, $t_p=1.5$ ms, $g_p=0.5$ nS, and $E'_{non}=0$. It should be noted that non-NMDA receptor conductance is purely ligand (neurotransmitter) dependent. The NMDA conductance, on the other hand, is both ligand dependent, due to the binding of neurotransmitters released from the pre-synaptic neuron, and dependent on the spine head membrane voltage. The current through the NMDA receptors is given by:

$$I_{NMDA}^{(t)} = (E_{NMDA}-V_{head})\frac{g_n\left(e^{\frac{1}{\tau_1}}-e^{\frac{1}{\tau_2}}\right)}{1+n[Mg^{2+}]e^{-\gamma V_{head}}} \qquad \text{Equation 2}$$

Where $\tau_1=80$ ms, $\tau_2=0.67$ ms, $\eta=0.33$ nM$^{-1}$, $\gamma=0.06$ mV$^{-1}$, $E_{NMDA}=0$ and $g_n=0.2$ nS. The voltage dependence of the NMDA receptor arises from the fact that the receptors are inhibited by magnesium ions $Mg^{2+}$ having a binding rate constant which is dependent upon the spine head membrane voltage. Near the resting membrane potential, the NMDA receptor channels are almost completely blocked by the $Mg^{2+}$ ions, and thus little current flows. As the spine head membrane becomes partially depolarized, the $Mg^{2+}$ ions become dislodged and more NMDA current flows.

The post-synaptic flow of $Ca^{2+}$ ions through the NMDA receptor channels is crucial for the induction of LTP and LTD. Upon entering the dendritic spine, the $Ca^{2+}$ ions trigger a series of events that lead to the induction and maintenance of LTP or LTD. The precise mechanisms, however, are not well understood. One theory is that a second messenger, such as nitric oxide, is activated by the $Ca^{2+}$ ions and certain calcium dependent proteins and then diffuses back to the pre-synaptic terminal, stimulating the release of more glutamate. Thus, this retrograde messenger operates as a positive feedback mechanism. This model is limited, however, in that it only explains LTP.

Another model suggests that rather than affecting pre-synaptic neurotransmitter release, the induction of LTP or LTD modulates the post-synaptic conductance of the non-NMDA receptor channels, which carry the bulk of synaptic current. This model also relies on the influx of $Ca^{2+}$ ions into the dendritic spines through the NMDA channel. During high frequency simulation, the $Ca^{2+}$ ions reach high concentrations in the compartmentalized spine head and preferentially activates a protein kinase. During low frequency simulation, lower concentrations are reached and a protein phosphatase is released. Both proteins act on a common phosphoprotein, which triggers LTP or LTD by modulating the non-NMDA receptor channel conductance.

It would, therefore, be desirable to provide an analog very large scale integrated (VLSI) circuit implementation of a biological neuron which includes circuitry for the synapse through which neurons communicate, and the dendrite which serves as the connection between the synapse and neuron cell body. It would also be desirable to provide a circuit which represents the means which actually produce the action potential in a biological neuron. It would also be desireable to include in an analog VLSI implementation of a biological neuron, circuitry for adaptation or learning.

SUMMARY OF THE INVENTION

In accordance with the present invention, a circuit which implements functions of a biological nervous system includes a plurality of neuron circuits and a plurality of synapse circuits. The synapse circuits are coupled to provide a path through which the plurality of neuron circuits communicate. Each of the plurality of neuron circuits include (1) a neuron cell membrane circuit, (2) a learning circuit coupled to said neuron cell membrane circuit; and (3) a dendrite circuit coupled to the neuron cell membrane circuit. Each of the synapse circuits include means for modifying the synaptic conductance With this particular arrangement, a neuron circuit which models a biological neuron circuit and in particular which emulates the neuron synapse is provided. By providing the neuron circuit with circuitry which allows adaptation or learning function to be performed, the neuron circuit of the present invention more closely models a biological neuron than prior art systems. The synapse circuit includes an NMDA channel circuit which is coupled in parallel with a non-NMDA channel circuit between first and second terminals of the synapse circuit. Also coupled in parallel between the first and second terminals of the synapse circuit in parallel with the NMDA and non-NMDA channel circuits is a storage element. The non-NMDA channel circuit controls the induction of LTP and LTD in the neuron circuit thereby emulating the response to a neurotransmitter in a biological neuron. In particular, the induction of LTP is characterized by a prolonged increase in the conductance of the non-NMDA receptor channel, while the induction of LTD is characterized by the decrease in conductance of the non-NMDA receptor channel. The NMDA channel circuit provides a current which is approximately proportional to the flow of magnesium ions ($Ca^{2+}$) into the spine head. The NMDA circuit emulates the response to the neurotransmitter. This controls long term memory effects in biological systems. The response to the post-synaptic neuron gives a pairing effect meaning that an NMDA receptor receives signals from both pre- and post-synaptic neurons and provides a response thereto. In a biological neuron, non-NMDA "channels" carry sodium ions ($Na^+$) which are abundant while NMDA "channels" regulate the flow of calcium ions ($Ca^{2+}$) to the neuron. The calcium is the internal messenger. Once the calcium travels into the cell body, it triggers chemical reactions (referred to as "secondary messengers") in the post-synaptic cell. These secondary messengers affect the non-NMDA channels by increasing or decreasing the transmission in the channel. The neuron circuit of the present invention emulates the calcium influx via the NMDA channels and generates a signal which controls the response of the non-NMDA circuits by controlling the number of channels in those circuits which are open or closed.

In accordance with a further aspect of the present invention, an integrated circuit which implements functions of a biological nervous system includes circuits designed to emulate the electrical characteristics of actual neurons. In particular, the circuits emulate the neuron cell membrane, the dendritic structure, and a synapse. In one embodiment, one particular type of synapse referred to as a Hebbian synapse is modeled. These circuits are more neuromorphic compared to most analog neural networks. The neuron cell membrane circuits include circuitry to represent the sodium and potassium ion channels in the membrane. The synapse circuits include circuit portions which correspond to different types of synaptic current channels. Moreover the neuron circuit design of the present invention includes circuits which modify the synaptic conductance, or strength of the neuron through a feedback mechanism. With this particular technique, an analog CMOS circuit implementation of an electrical model of a biological synapse is provided. In particular, the circuits emulate the synaptic modification, the learning mechanism, exhibited in certain types of neurons. This can be used in an artificial neural network that emulates neural computation in a manner which is more realistic than conventional electronic artificial neural networks. In one embodiment, the integrated circuit of the present invention is implemented using CMOS circuits.

BRIEF DESCRIPTION OF THE DRAWINGS

The foregoing features of the invention, as well as the invention itself may be more fully understood from the following detailed description of the drawings, in which.

DESCRIPTION OF THE PREFERRED EMBODIMENTS

Figure 1:
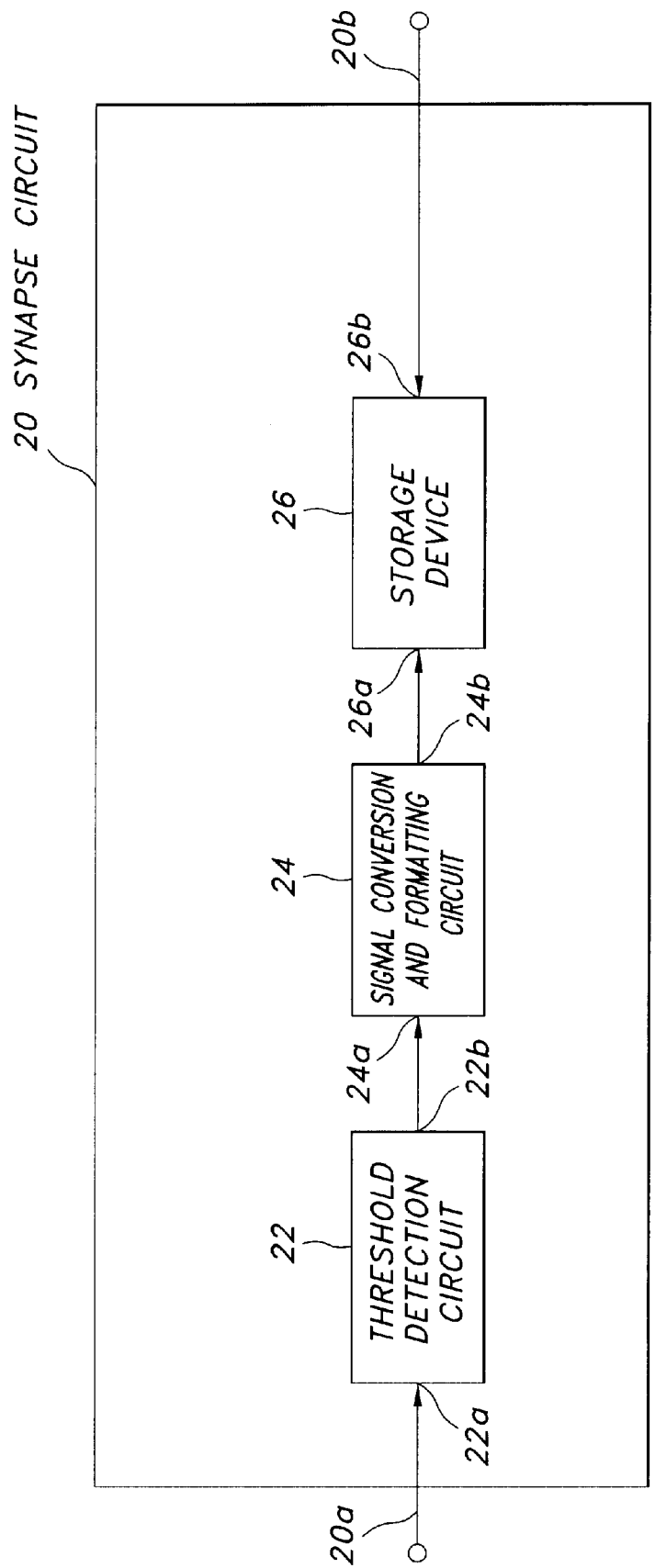
FIG. 1 is a block diagram of a synapse circuit.

Before describing the apparatus and processes for providing a neuron circuit, some introductory concepts and terminology are explained.

The biological neuron is the basic anatomical unit of a biological nervous system. It includes a cell body equipped with a tree of filamentary structures called dendrites. The dendrites are covered with structures called synapses. The synapses act as junctions through which are formed connections with other neurons. The synapses are the primary information processing elements in neural systems. The dendrites sum the synaptic inputs from other neurons, and the resulting currents are integrated on the membrane capacitance of the cell body until a signal threshold level is reached. At that point, an output neuron pulse, called the action potential, is generated and then propagates down the neuron's axon which is a relatively long structure used to transmit data. The end of the axon consists of a tree-shaped structure of synaptic contacts that connect to the dendrites of other neurons.

The electrical activity in a neuron cell body occurs in the thin membrane that electrically separates the neurons interior from exterior fluid. An energy barrier is formed by the cell membrane that is so high that few ions are able to surmount it. Inside all cell membranes are metabolic pumps that actively expel sodium ions from the cytoplasm while importing potassium ions from the extra-cellular fluid. Typical concentrations of these ions inside and outside the cell are shown in Table I below.

TABLE I

| Ion | Concentration Inside (mM/l) | Concentration Outside (mM/l) | Reverse Potential (mV) |
|---|---|---|---|
| Potassium (K+) | 400 | 10 | −92 |
| Sodium (Na+) | 50 | 460 | 55 |
| Chlorine (Cl−) | 40 | 540 | −65 |

The concentration gradient that exists across the membrane is used to power electrical activity. Ions diffuse in/out, respectively, of the membrane while electrically drifting out/in.

When the voltage across the membrane reaches the reverse potential $V_r$ the diffusion of ions will be exactly counterbalanced by the drift of ions. The reverse potential $V_r$ may be computed as shown in Equation 3 below:

$$V_r = -\frac{kT}{q}\ln\frac{N_{in}}{N_{ex}}, \quad \text{Equation 3}$$

The reverse potentials for the three ions in the membrane are shown in Table I. In operational terms, the sodium reverse potential may be thought of as a positive power supply rail and the potassium reverse potential as the negative rail.

The electrical characteristics of the cell membrane may be represented as four parallel legs of a circuit. Three of the legs include a voltage source representing the reverse potentials of the ions, and with a conductance which represents the membrane permeability for that ion. The membrane capacitance is represented as the fourth leg and can be depicted as a lumped capacitor. For a given membrane voltage, the current through the membrane (i.e., the capacitor current) can be expressed as:

$$I_{mem} = (V_{memK} - V_K)G_K + (V_{Na} - V_{mem})G_{Na} + (V_{Cl}V_{mem})G_{Cl} \quad \text{Equation 4}$$

Any net current will charge or discharge the membrane capacitance until the current is reduced to zero. Under normal conditions, the chlorine current is small and can be neglected. With this assumption, the voltage at which the net current is zero can be expressed as:

$$V_o = \frac{V_K G_K + V_{Na} G_{Na}}{G_K + G_{Na}} \quad \text{Equation 5}$$

in which $V_0$ represents a so-called resting potential and is typically equal to a voltage of about −85 millivolts (mV), although it can vary considerably. A neuron at rest is termed "polarized" to a negative potential and when the membrane potential becomes more positive the neuron is said to become depolarized.

There are a number of different potassium ion currents. The delayed rectifier current, IKD, along with the sodium current, generates the neuronal impulse. Two other potassium currents with slower dynamics, the so-called A-current (IKA) and the calcium dependent potassium current (IAHP or after-hyperpolarizing current), control the rate at which impulses are produced.

The activation and inactivation of the ion conductance in the membrane are themselves dependent on the membrane voltage and time. There is a sigmoidal relationship between the ion conductance and the membrane voltage. This creates a thresholding behavior that is responsible for the generation of the neuron pulse, or action potential. As the membrane becomes depolarized (in response to, for instance, an influx of synaptic current), there is a transient in the sodium conductance, followed by a delayed but prolonged increase in the potassium conductance. The currents through these conductance paths create the action potential.

In traditional analog CMOS circuits, the transistors are biased in the saturation, or strong inversion, region of operation, where the drain current is given by $$I_{DS} = \frac{k'}{2}\frac{W}{L}(V_{GS} - V_t^2(1 + \lambda V_{DS}) \quad \text{Equation 6}$$

where k' is a physical parameter, W/L is the ratio of the transistor channel width to channel length, $V_{GS}$ is the gate-to-source voltage, $V_t$ is the threshold voltage of the transistor, λ is the inverse of the Early voltage of the transistor, a parameter related to the output resistance of the device, and $V_{DS}$ is the drain-to-source voltage. For $\lambda V_{D(S)>>}1$, the current is roughly independent of the drain-to-source voltage.

In prior art systems, the transistor is not used in the subthreshold, or weak inversion, region of operation. In this region, the current levels are very small and the drain current varies exponentially with the gate voltage as shown by Equation 7:

$$I_{DS} = k_x \frac{W}{L} e^{\frac{V_{GS}}{nV_T}} \left(1 - e^{\frac{V_{GS}}{V_T}}\right) \quad \text{Equation 7}$$

in which $k_x$ and n are fabrication dependent parameters and $V_T$ is the thermal voltage, which is approximately 26 millivolts at room temperature. For drain-to-source voltages greater than a few thermal voltages, the drain current is essentially independent of the drain-to-source voltage.

Many of the circuits described herein utilize transistors biased in the subthreshold region, to take advantage of the exponential relationship between current and voltage, which is prevalent in actual neurons. CMOS technology is used instead of bipolar technology because of the greater availability of CMOS processes. Also, the current levels, and hence time scales, of subthreshold CMOS transistors match up fairly well with the actual biological levels. Additionally, the nearly infinite resistance of the MOS gate is useful in many circuits. It should be noted, however, that in some applications bipolar or some technology other than CMOS technology may be preferred. Regardless of the particular technology used to fabricate physical devices or circuits which implement the functions and techniques of the neuron and synapse circuits described herein, the principles of the invention described herein still apply.

Referring now to FIG. 1, a synapse circuit 20 includes a threshold detection circuit 22 having a first port 22a coupled to a first port 20a of the synapse circuit 20 and a second port 22b coupled to a first port 24c of a signal conversion and formatting circuit 24. A second port 24b of the signal conversion and formatting circuit 24 is coupled to a first port 26a of a storage device 26. The storage device 26 may include both an analog storage device for short term memory and a digital storage device for long term memory. A second port 26b of the storage device 26 is coupled to a second port 20b of the synapse circuit 20.

In operation, the synapse circuit 20 receives one or more signals at port 20a. In response to the one or more signals, the threshold detection circuit 22 provides at port 22b a response signal having a response signal level dependent upon the signal level of the signal received at port 22a. The response signal is provided to signal conversion and formatting circuit 24 which converts the signal to a digital format and appropriately formats the signal for storage in the storage device 26.

Figure 2:
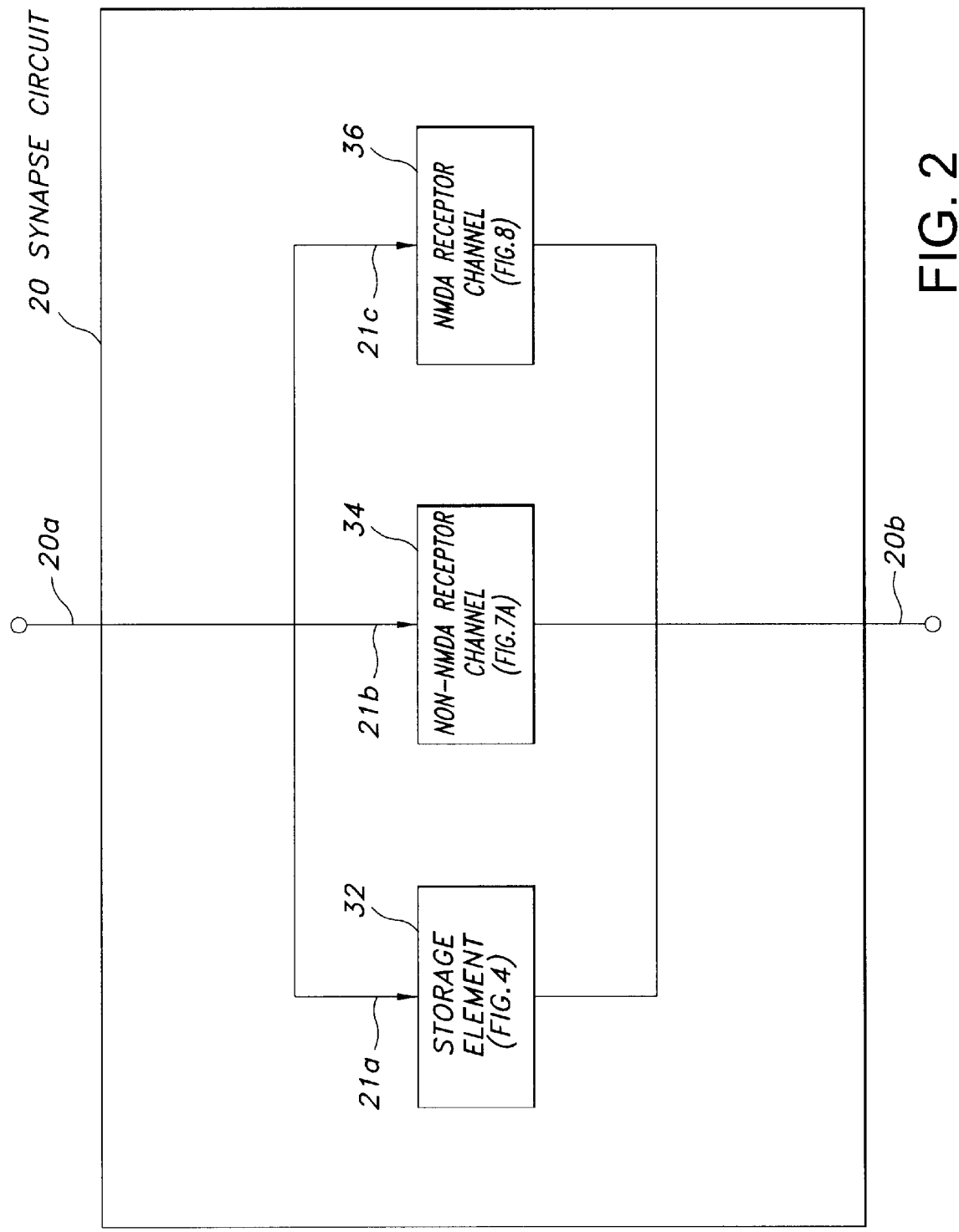
FIG. 2 is a block diagram of a synapse circuit having a pair of receptor channels and a storage element.

Referring now to FIG. 2, an alternate representation of synapse circuit 20 is shown to include parallel signal paths 21a–21c. In this embodiment, a storage element 32 has a first port coupled to synapse port 20a and a second port coupled to synapse port 20b. In alternate embodiments, the synapse circuit 20 also includes a relatively small leakage conductance and capacitance that represents the membrane capacitance of the spine head.

Figure 6A:
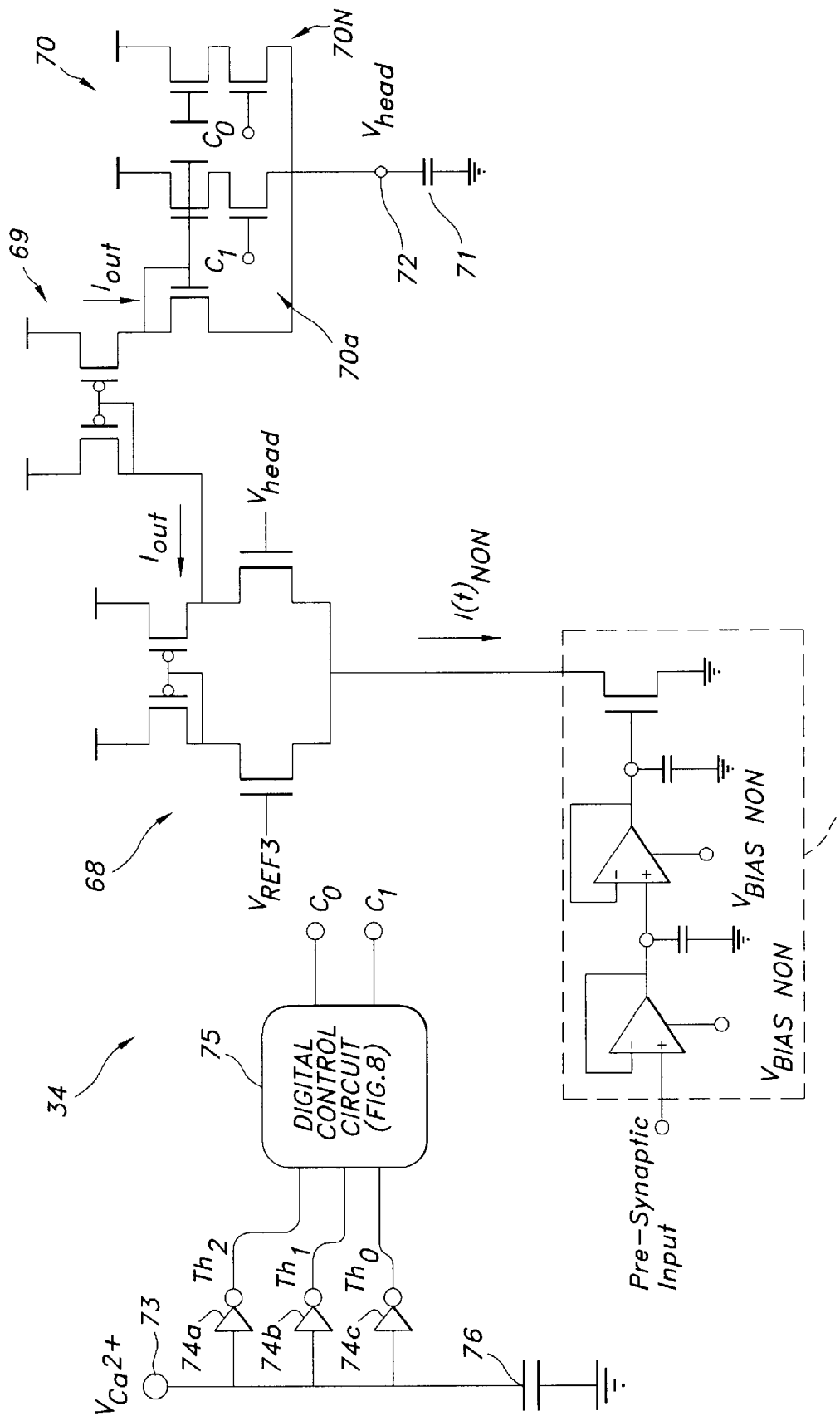
FIG. 6A is a block diagram of a non-NMDA receptor channel circuit.

The storage element 32 will be discussed in detail below in conjunction with FIGS. 4, 6A and 7. Suffice it here to say that the storage element 32 can include a short term memory portion which may be implemented as an analog circuit and a long term memory portion which may be implemented in a digital circuit.

As discussed above, simulation of a pre-synaptic biological neuron causes the release of neurotransmitters from the axon terminal of the neuron. These neurotransmitters include the amino acid glutamate. The transmitters bind to corresponding receptors on the post-synaptic membrane, causing ion channels to open up through these receptors. Glutamate binds to three types of receptors: n-methyl-D-aspartate (NMDA), quisqualate, and kainate. LTP and LTD are both mediated by the NMDA receptors, which carry primarily $Ca^{2+}$ currents. The other receptors, termed the non-NMDA receptors, carry the rest of the synaptic current, consisting mainly of sodium ions $Na^+$, with negligible calcium ion $Ca^{2+}$ content. These receptors are located on a spine head connected to the dendritic shaft. Thus, the total synaptic current consists of the sum of the NMDA and non-NMDA currents.

By providing synapse circuit 20 with the parallel signal paths 21a–21c, the synapse circuit 20 provides currents from the NMDA and non-NMDA circuits which are summed at terminal 20b of the synapse circuit 20. The current through the non-NMDA channels in response to a pre-synaptic stimulus is given by an alpha function:

$$I_{non} = (E_{non} - V_{head})\kappa g_p t e^{t/p1} \quad \text{Equation 8}$$

in which $\kappa = e/t_p$, e is the base of the natural logarithm, $t_p = 1.5$ ms, $g_p = 0.5$ nS, and $E_{non} = 0$. It should be noted that non-NMDA receptor conductance is purely ligand (neurotransmitter) dependent.

The NMDA conductance, on the other hand, is both ligand dependent, due to the binding of neurotransmitters released from the pre-synaptic neuron, and dependent on the spine head membrane voltage. The current through the NMDA receptors is given by:

$$I_{NMDA}(t) = (E_{NMDA} - V_{head}) \frac{g_n \left(e^{\frac{1}{t_1}} - e^{\frac{1}{t_1}}\right)}{1 + \eta[Mg^{2+}]e^{-\gamma V_{head}}} \quad \text{Equation 9}$$

where $\tau_1 = 80$ ms, $\tau_2 = 0.67$ ms, $\eta = 0.33$ nM$^{-1}$, $\gamma = 0.06$ mV$^{-1}$, $E_{NMDA} = 0$ and $g_n 0.2$ nS.

The voltage dependence of the NMDA receptor arises from the fact that the receptors inhibited by $Mg^{2+}$ ions whose binding rate constant is dependent on the spine head membrane voltage. Near the resting membrane potential, the NMDA receptor channels are almost completely blocked by the $Mg^{2+}$ ions, and thus little current flows. As the spine head membrane becomes partially depolarized, the $Mg^{2+}$ ions become dislodged and more NMDA current flows.

A non-NMDA receptor channel 34 also has a first port coupled to ports 20a and 20b of synapse circuit 20. The non-NMDA receptor channel 34 will be discussed in detail below in conjunction with FIG. 6. Suffice it here to say that the non-NMDA receptor channel circuit 34 itself includes a number of channels which are set in particular conduction states. The number of channels and the particular conduction states of each of the channels determines the conductance values of the non-NMDA current. The non-NMDA current as well as the digital expression of memory aid in providing the circuit having a memory characteristic that in turn influences the rest of the neuron circuit.

Similarly, an NMDA receptor channel 36 has a first port coupled to ports 20a and 20b of synapse circuit 20. NMDA receptor channel 34 will be discussed in detail below in conjunction with FIG. 7. Suffice it here to say that the NMDA receptor channel circuit controls the long term memory effects because it responds to the neurotransmitters and the response is provided to the post-synaptic neuron. This provides a desired pairing effect.

Figure 3:
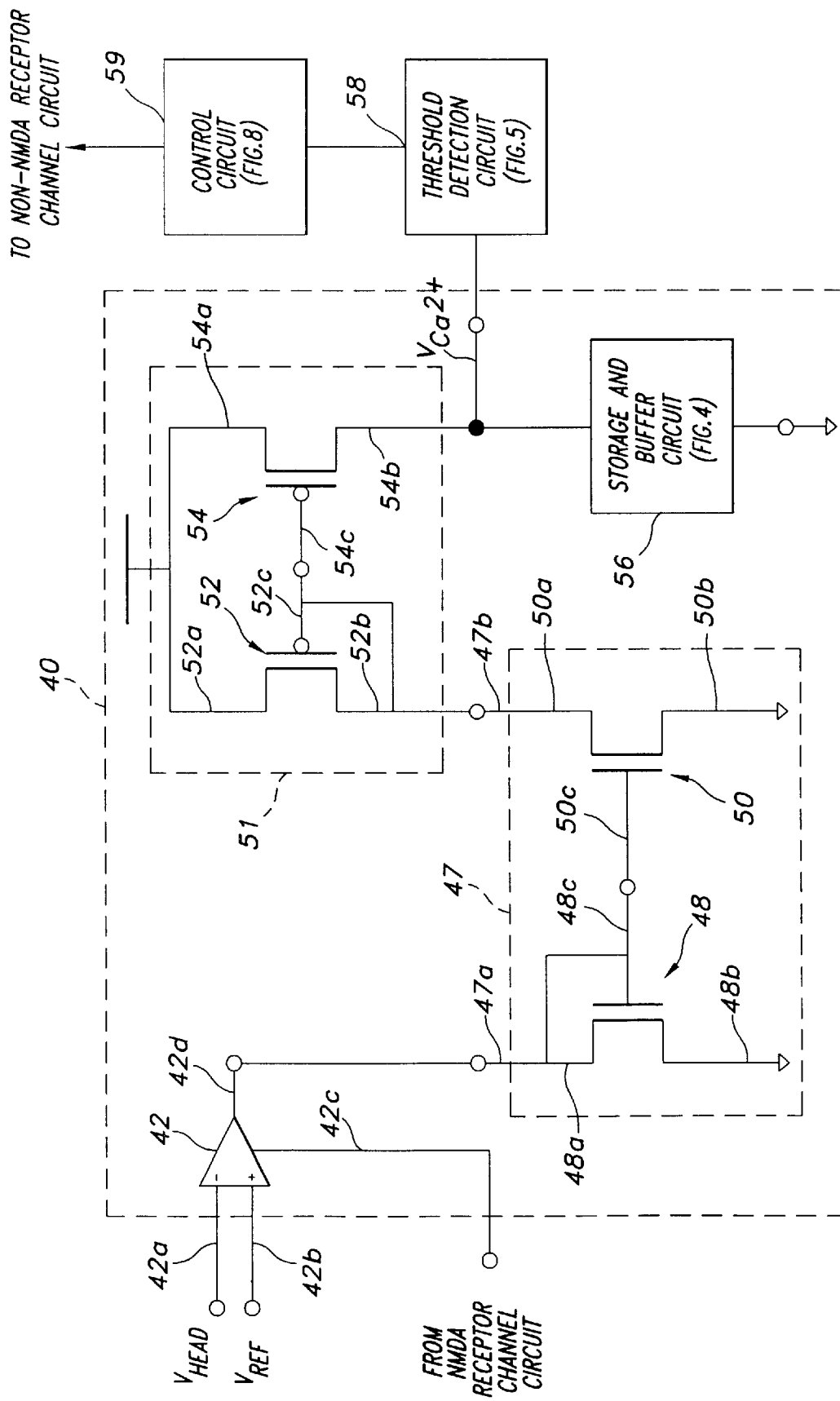
FIG. 3 is a block diagram of a calcium concentration measurement circuit.

Referring now to FIG. 3, a calcium concentration measurement circuit 40 which measures the concentration of calcium ions $Ca^{2+}$ in the compartmentalized spine head includes a transconductance amplifier 42 having a first terminal 42a coupled to receive a first signal $V_{HEAD}$ and a second terminal 42b coupled to a reference voltage $V_{REF}$.

Amplifier 42 receives at a terminal 42c a signal from an NMDA receptor channel circuit, such as the NMDA circuit 36 described above in conjunction with FIG. 2.

The output terminal 42d of transconductance amplifier 42 is coupled to a first terminal 47a of a diode connected NMOS current mirror 47 provided from a pair of transistors 48, 50 having drain, source and gate electrodes 48a–48c and 50a–50c, respectively. Transistor 48 is coupled in a diode-connected configuration.

In the diode-connected circuit configuration, the gate electrode 48c of the transistor 48 is connected to the drain electrode 48a. Thus, the gate-to-source voltage equals the drain-to-source voltage (i.e. $V_{GS}=V_{DS}$), which for all useful gate-to-source voltages means the drain-to-source voltage term $V_{DS}$ in Equation 7 is negligible, thus ensuring that the transistor 48 operates in a saturation state.

A second terminal 47b of current mirror 47 is coupled to a first terminal 51a of a second current mirror 51 which is here provided as a PMOS current mirror utilizing a pair of transistors 52, 54 having drain, source and gate electrodes 52a–52c and 54a–54c, respectively.

In the NMOS current mirror 47, transistor 48 is diode-connected, and its gate is also connected to the gate electrode 50c of the transistor 50. Since transistors 46, 48 share a common source, each of the transistors 48, 50 the same gate-to-source voltage $V_{GS}$. Hence, assuming that the drain-to-source voltage $V_{DS}$ of the transistor 50 is large enough for transistor 50 to be saturated also, the current $I_{ouT}$ may be expressed as:

$$I_{OUT} = \frac{W_2/L_2}{W_1/L_1} I_{IN} \qquad \text{Equation 10}$$

As can thus be seen from Equation 10, the current mirror 47 both "mirrors" and scales the input current $I_{IN}$.

As mentioned above, the calcium concentration measurement circuit 40 measures the concentration of $Ca^{2+}$ ions in the compartmentalized spine head. The $Ca^{2+}$ ions are the impetus for the induction of LTP or LTD. The $Ca^{2+}$ ions enter the spine head primarily from the NMDA channel current, which mostly consists of $Ca^{2+}$ ions. Thus, the flow of $Ca^{2+}$ ions into the spine head is somewhat proportional to the NMDA current.

Hence, a relatively accurate measure of the $Ca^{2+}$ concentration in the spine head is the measure of net charge over time that flows in the NMDA current. This charge is accumulated in the storage and buffer circuit 56 which provides a means for temporarily storing the charge. Storage and buffer circuit 56 may be implemented in a variety of techniques one of which will be described below in conjunction with FIG. 4. Briefly, however, the storage and buffer circuit 56 stores the signal provided from the current mirror 51. The storage and buffer circuit 56 is thus provided having at a terminal thereof a signal level (e.g. a signal voltage level) which is proportional to the signal provided from current mirror 51. In this manner, the concentration of $Ca^{2+}$ ions can be measured by accumulating a scaled copy of the NMDA current in the storage and buffer circuit 56. The signal stored in the storage buffer circuit 56 thus represents the concentration of $Ca^{2+}$ ions.

A threshold detection circuit 58 determines when the signal stored in storage and buffer circuit 56 reaches a predetermined signal level. When the stored signal voltage crosses certain voltage levels, the concentration of $Ca^{2+}$ ions in the spine head reaches certain levels thus triggering LTP or LTD. Consequently the signal voltage can be descriptively denoted $V_{CA2+}$. Thus, threshold detection circuit 58 indicates when the particular levels are reached.

Figure 4:
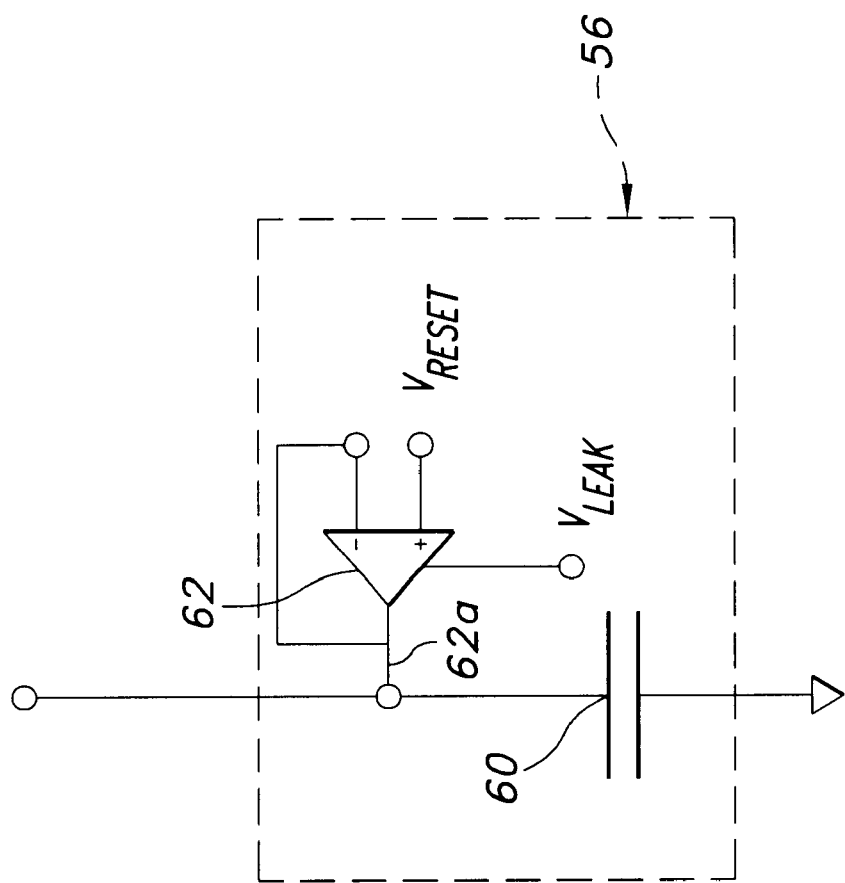
FIG. 4 is a block diagram of a storage and buffer circuit.

Referring now to FIG. 4, the storage and buffer circuit 56 includes a capacitor 60 having a first terminal coupled to storage and buffer circuit terminal 56a and a second terminal coupled to a reference potential which here corresponds to ground. It should be noted that the second reference voltage could also correspond to a positive or negative voltage level. A transconductance amplifier 62 has an output terminal 62a coupled to the first terminal of capacitor 60 and a first input terminal coupled to a reference voltage $V_{RESET}$ A bias voltage $V_{LEAK}$ is coupled to a bias terminal of the amplifier 62. The capacitor 60 accumulates charge from current mirror 51 and thus is provided having voltage which is proportional to the charge. That is, the concentration of $Ca^{2+}$ ions can be measured by accumulating a scaled copy of the NMDA current onto the capacitor 60. The voltage stored in the temporary storage buffer 56 thus represents the concentration of calcium ions $Ca^{2+}$ and is modeled as a short term memory by the capacitor 60. For long term memory, the analog circuit is converted to a digital signal and can be stored in a digital storage device. The voltage on the capacitor can be expressed as:

$$Q(t_2) - Q(t_1) = \int_{t_1}^{t_2} I(t)dt. \qquad \text{Equation 11}$$

The NMDA current is mirrored and scaled by the PMOS current mirror 51. This current then is accumulated onto a capacitor having a first terminal coupled to the current mirror 51 and having a second terminal coupled to ground. The voltage on the capacitor can be expressed as $$V_{ca^{2+}}(t)=1/C\int_0^t NMDA(t)dt+V_{ca^{2+}}(0). \qquad \text{Equation 12}$$

This provides for a leakage current having a time constant determined by the value of $g_m$ and thus is controllable by modifying the bias voltage $V_{LEAK}$ of the amplifier 62 and the capacitance of the capacitor 60. The voltage $V_{RESET}$ determines the resting level of the capacitor voltage when no current is either flowing onto or leaking off of the capacitor 60.

Storage and buffer circuit 56 thus acts as a membrane capacitance and leakage conductance circuit 56 which represents cell membrane capacitance. In this sense, capacitor 62 can be considered as being coupled between a "membrane" node and ground. The particular structure of the membrane node and ground is discussed below. In this particular embodiment, the capacitor 62 is provided having a capacitance value typically of about 1 picofarad (pf). There is also a leakage conductance in the neuron cell membrane (not shown in FIG. 4) the value of which can be treated as constant.

This leakage conductance is implemented using the transconductance amplifier 62 connected in a follower-integrator configuration, with the output voltage being the membrane voltage and the capacitor 60 corresponding to the membrane capacitance. The input voltage of the amplifier 62 should be the resting potential voltage. Since there is no leakage current when the membrane voltage is at the rest resting potential. The value of the leakage conductance is determined by the bias voltage of the transconductance amplifier, which determines its $g_m$. The use of a transconductance amplifier yields a relatively close approximation of the linear conductance. If it is desirable to increase the range over which there is an approximately constant conductance, a wide input range transconductance amplifier can be used in place of the simple transconductance amplifier 62.

In an alternate embodiment, the leakage conductance can be implemented using a single transistor, having a gate voltage set to control the leakage current. This implementation does not emulate a true conductance however, as the current through the transistor does not vary, to first order, with its drain to source voltage. Nonetheless, since the leakage current is relatively small, the loss of accuracy comes with the benefit of a very simple and small implementation with a single transistor.

A complete neuronal cell membrane circuit, including all of the synaptic circuits with the exception of the digital control circuitry, and the horizontal resistor circuit can be fabricated as a single integrated circuit. The digital control circuitry of the synaptic circuit can be implemented off chip using field programmable gate arrays. In one embodiment, the threshold circuitry of the synapses includes four CMOS buffers, each with different switching thresholds. The scaling circuitry of the dendritic circuit can be implemented off-chip using discrete components and all bias voltages can be set on or off chip (i.e. on-chip or off-chip voltage references can be used). In some embodiments, it may be desirable to utilize some off-chip voltage references to increase the flexibility in testing and to allow alteration of the reference voltages which set conductances and time constants. In other embodiments, such as high quantity manufacturing embodiments, it may be desirable to utilize only on-chip reference voltages.

The capacitors were laid out using two layers of polysilicon that were available in the Orbit 2 micron process. Poly-poly capacitors have capacitances that are nearly independent of voltage, and thus can be operated over the full five volt voltage range. In contrast, poly-diffusion capacitors are highly nonlinear with respect to voltage. It was not critical to lay out especially precise capacitors, as they generally served to form a time constant with a conductance whose value could be externally set. Furthermore, it is not necessary to match the operating characteristics of any capacitors.

In one embodiment, roughly 15 silicon neuron-synapse pairs can be integrated on one MOSIS tinychip (die area 2.2 mm.×2.2 mm), with the Orbit 2.0 micron process, if the digital control circuit/memory is implemented off-chip, using FPGAs. If this circuitry is included on-chip, then roughly 10 neuron-synapse pairs can be integrated on the MOSIS tinychip. Considering that the density of an integrated circuit is roughly proportional to the square of the minimum feature size, a decrease in feature size to 0.25 or 0.35 micron (typical industrial process, then the number of silicon neuron-synapse pairs that can be integrated on a 2.2 mm.×2.2 mm. die is increased by a factor of roughly 100. Thus, depending upon whether the digital control circuitry for the synapse is implemented off or on chip, approximately 1000 to 1500 silicon neuron-synapse pairs can be implemented on a die area of 2.2 mm.×2.2 mm. Die areas can typically be 10–100 times larger than this. However, as one increases the die area, and pinout, the number of circuits capable of being integrated may increase.

Considering that the density of an integrated circuit is roughly inversely proportional to the square of the minimum feature size, a decrease in feature size to 0.25 (typical 1997 industrial process), then the number of silicon neuron-synapse pairs that can be integrated on a 2.2 mm.×2.2 mm. die is increased by a factor of roughly 64. Thus, approximately 6400 silicon neuron-synapse pairs can be implemented on a die area of 2.2 mm.×2.2 mm. The maximum 1997 chip area was approximately 100 times larger than this. Therefore, with a state-of-the-art 1997 fabrication process, approximately 96,000 (15*64*100) silicon neuron-synapse pairs could be integrated.

Figure 5:
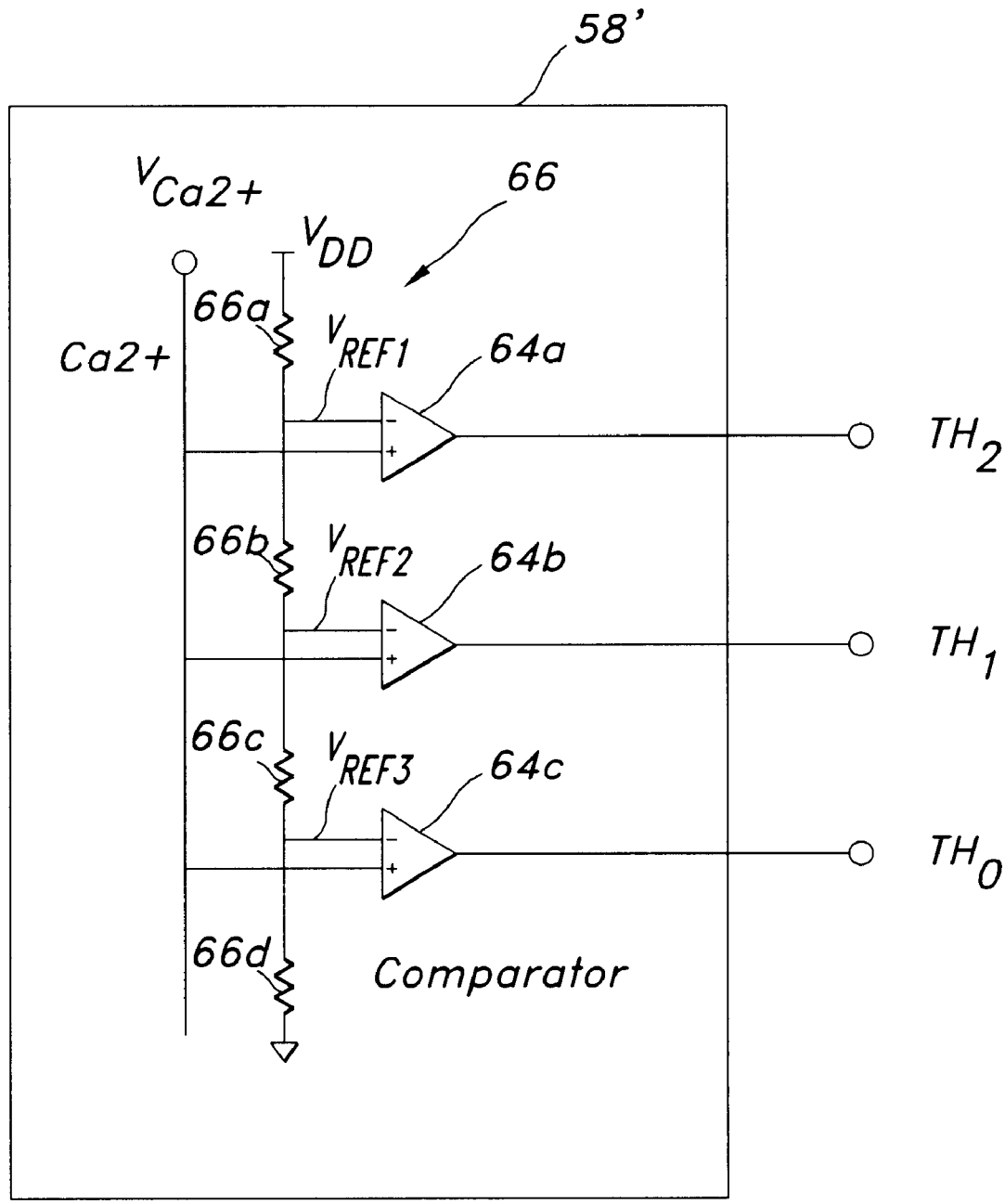
FIG. 5 is a block diagram of a threshold detection circuit.

Referring now to FIG. 5, a threshold detection circuit 58' which may, for example, be provided as the type used in the manner described above in conjunction with FIG. 3, includes a plurality of comparators 64a–64c each of which has a first or negative terminal coupled to respective ones of reference voltages $V_{REF1}$–$V_{REF3}$. When the concentration of $Ca^{2+}$ ions in the spine head reaches certain levels, LTP or LTD may be triggered and threshold detection circuit 58' determines when $V_{Ca2+}$ has crossed certain voltage levels.

In this particular embodiment, the reference voltages are set through a resistive network 66. A first terminal of network 66 is coupled to a first reference voltage VDD and second terminal of network 66 is coupled to a second reference voltage. Here the second reference voltage corresponds to ground but it should be noted that the second reference voltage could also correspond to a positive or negative voltage level. Coupled between the first and second terminals of resistive network 66 are a plurality of serially connected resistors 66a, 66b, 66c which provide the reference voltages $V_{REF1}$–$V_{REF3}$. The reference voltages are thus generated by a resistive voltage divider 66 of the power supply voltage. This technique can be used when the comparators 64a–64c draw little current at the input terminals which is often a reasonable assumption. This technique has the advantage of dissipating a relatively small amount of static power and the amount of power dissipated can be reduced by appropriately selecting the resistance values of the resistors 66a–66c. Utilizing resistors having a relatively large resistance value require a relatively large amount of area on an integrated circuit while utilizing resistors having a relatively small resistance value require a relatively small amount of area on an integrated circuit. It should, of course, be appreciated that the reference voltages $V_{REF1}$–$V_{REF3}$ could also be generated using other techniques. For example, the reference voltages could also be generated using band-gap or zener diodes.

In operation, each comparator 64a–64c compares the voltage signal $V_{Ca2+}$ to the reference voltage and produces a digital 1 if the voltage level of the signal $V_{Ca2+}$ is greater than the reference voltage level and a digital 0 if the voltage level of the signal $V_{Ca2+}$ is less than the reference voltage signal level. The comparators 64a–64c can be implemented via commercially available comparator circuits Alternatively, comparator circuits 64a–64c can be implemented via a high gain differential voltage amplifier having an output coupled to a digital buffer. In this embodiment, when the inputs of the amplifier are slightly different, the amplifier saturates and the output voltage is very near one of the power supply rails. The digital buffer then assures that a good logic value is obtained, as well as buffering the amplifier output.

A simple alternative to a complete comparator is to use only digital buffers (which is essentially an amplifier) to compare the voltage level of the signal $V_{Ca}{}^{2+}$ to a reference voltage signal level. In this case, each digital buffer assumes the role of the comparator in while the voltage reference corresponds to a switching voltage of the digital buffer. The switching voltage of the digital buffer can be adjusted by appropriately changing the relative sizes of the p-channel and n-channel devices in the buffer. One drawback to this approach, however, is that the reference voltages are subject to mismatch between transistors and are not adjustable once implemented.

Referring now to FIG. 6, a non-NMDA receptor channel circuit 34 includes a transconductance amplifier 68 which provides an output current $I_{out}(t)$. The output current $I_{out}(t)$ can be computed as:

$$I_{out} = I(t)\left(\frac{1}{2} \frac{V_{Ref} - V_{Head}}{nV_T}\right).$$ Equation 13

For consistency, the voltage range used in the non-NMDA receptor channel circuit 34 is the same as that used in the NMDA circuit to be described below in conjunction with FIG. 7. This implies that the non-NMDA receptor channel circuit 34 can utilize a wide input range amplifier rather that transconductance amplifier 68. The output current $I_{out}(t)$ is then scaled and mirrored by the p-channel current mirror 69 (which is required since the output voltage of the amplifier is near the supply voltage) and provided to a control circuit 70 provided from a set of conductance transistors 70a–70N.

The conductance transistors 70a–70N form what is essentially an n-channel current mirror with multiple legs, in the form of a simple digital-to-analog converter. The legs of the current mirror contain control transistors 70a–70N that turn on or off each leg of the conductance. With this technique, the binary control inputs can be used to regulate the peak amount of non-NMDA current that flows into the spine head.

Each set of control input values corresponds to the different conductance levels associated with LTP and LTD. In FIG. 6, each succeeding leg of the D/A converter control circuit 70 is scaled by a factor of two, so that the conductance changes are binary, corresponding to the control values. If the peak non-NMDA current is plotted as a function of spine head voltage (e.g. for a nominal set of control inputs), ideally, the slope of the curve should be constant, as the non-NMDA conductance is not a function of the spine had voltage. Nonetheless, the slope, and hence, conductance, should remain relatively constant over the range of spine head voltages.

In biological neurons, the conductance changes associated with LTP and LTD occur smoothly in value and time. However, in the non-NMDA receptor channel circuit 34 of the present invention, the conductance changes in discrete steps. Although in this particular embodiment only two control signals $C_0$, $C_1$ are shown, it should be appreciated that circuitry to accommodate more control signals could be added to increase the number of different conductance levels. As the number of control signals increase, the size of the discrete steps in conductance values decrease, and thus the circuit more closely approximates the smoothness of real neurons. Since more area on an integrated circuit is required to accommodate the control circuitry, a trade-off must thus be made between silicon area to accommodate the desired number of transistors and desired precision and smoothness of the conductance values. The current through the legs of the control circuit 70 charges a capacitor 71. When charged, the capacitor 71 holds a voltage $V_{head}$ at a node 72.

Recall that induction of LTP or LTD, and hence the regulation of the control inputs in the non-NMDA circuit, is determined by the ionized calcium level concentration in the spine head. The control signals $C_0$, $C_1$, which are digital in nature, are thus determined in part by the threshold detection circuitry in the manner discussed above in conjunction with FIGS. 3 and 5. The output of threshold signals $TH_0$, $TH_1$, and $TH_2$ of the detection circuit 58' are manipulated digitally, using information about the current conductance value, to produce the control inputs for the non-NMDA circuit 34.

In a preferred embodiment, the threshold signal levels $TH_0$–$TH_2$ are provided to a digital control circuit 75 via digital inverters 74a–74c rather than via the comparator-resistive network approach described above in conjunction with FIG. 5. The digital inverter approach results in a circuit which utilizes less power and can be implemented in less area on an integrated circuit than the comparator approach. In the digital inverter approach, each of the inverters 74a–74c is coupled to a reference voltage $V_{CA2+}$ at a node 73 and to a first terminal of a capacitor 76. The reference voltage $V_{CA2+}$ is provided by the NMDA receptor channel circuit 36 described below in conjunction with FIG. 7. A second terminal of the capacitor 76 is coupled to a second reference potential. Here the second reference voltage corresponds to ground but it should be noted that the second reference voltage could also correspond to a positive or negative voltage level.

The digital control circuit 75 receives the signals $TH_0$, $TH_1$, and $TH_2$ from the detection circuit 58', processes the signals $TH_0$, $TH_1$, and $TH_2$ in a manner to be described below in conjunction with FIG. 8 and provides the control signals $C_0$, $C_1$ to the control terminals of the conductance transistor control circuit 70.

The induction of LTP is characterized by a prolonged increase in the conductance of the non-NMDA receptor channel, while the induction of LTD is characterized by the decrease in conductance of the non-NMDA receptor channel. This is achieved in the conductance transistor control circuit 70 by the control signals $C_0$, $C_1$ which bias the respective transistors 70a–70N into conduction or non-conduction states. The digital control circuit 75 determines the signal levels of the control signals $C_0$, $C_1$ which turn on or off the conductance transistors 70a–70N and thus control current flow through the circuit legs provided by the transistors 70a–70N.

LTP and LTD are initiated when the concentration of $Ca^{2+}$ ions in the spine head reach certain levels. The calcium concentration measurement circuit and threshold detection circuits discussed above in conjunction with FIGS. 3–5 perform the functions of measuring the concentration of $Ca^{2+}$ ions in the spine head and determining when it has reached certain levels. The outputs of the threshold detection circuit 58 (FIG. 3) and 58' (FIG. 4) are digital values. These digital signals are then used to determine the value of the control inputs, $C_1$ and $C_0$, in FIG. 6. Thus the value of the non-NMDA conductance can range from its most depressed state, when $C_1=C_0=0$, to its most potentiated state, when $C_1=C_0=1$. The manner in which this is done depends upon the type of algorithm for LTP/LTD that is being implemented and is discussed below in conjunction with FIG. 8.

A cascaded follower-integrator circuit 77 is coupled to amplifier 68 and will be discussed in detail below in conjunction with FIG. 6B. Suffice it here to say that the follower-integrator circuit 77 receives a pre-synaptic input signal and provides an output signal which approximates the function: $\kappa g_p t^{-t/\tau_p}$.

Figure 6B:
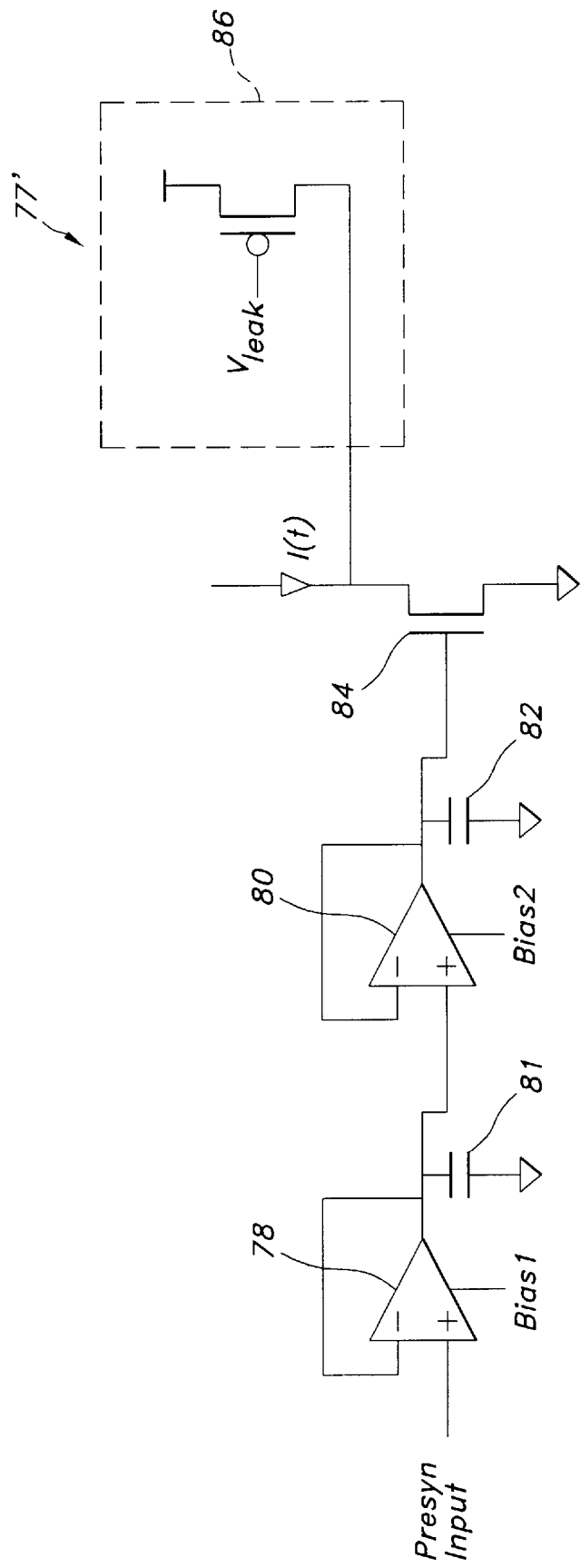
FIG. 6B is a block diagram of a cascaded follower-integrator circuit.

Referring now to FIG. 6B, a cascaded follower-integrator circuit 77' which acts as an RC delay line and provides a time varying current circuit function is shown. As discussed above, the NMDA and non-NMDA channels open in response to a pre-synaptic stimulus of the action potential of another neuron. For each stimulus, current flows according to Equations 3 and 4. The time dependence for each of these equations can be represented as an alpha function. These can be treated as the impulse responses of the spine head channels to a pre-synaptic stimulus. The Laplace transform of both impulse responses can be written as $$H(s) = \frac{1}{(1 + \tau_1 s)(1 + \tau_2 s)}$$ Equation 14

For the non-NMDA channel in some embodiments $\tau_1$ may be provided having the same value as $\tau_2$. It should be appreciated, however, that in other embodiments $\tau_1$ may be provided having a value which is different than $\tau_2$.

The current I(t) can be implemented in a number of ways. As shown in FIG. 6B, one technique to approximate the alpha function behavior is to apply a pre-synaptic input signal to a pair of cascaded follower integrators 78, 80. The output of the second follower integrator 80 is connected to a control electrode of a transistor 84. The transistor 84 is, in this particular example, implemented as an NMOS transistor 84 and the control electrode corresponds to the gate electrode of the transistor 84. The transfer function from input to the voltage on the gate electrode of the transistor 84 is given by:

$$V_{GS}/V_{in}=1/((1+\tau_1 s)(1+\tau_2 s)) \qquad \text{Equation 15}$$

If the input voltage is a unit impulse, then the gate voltage on the NMOS transistor 84 will change incrementally like an alpha function. If this change in gate voltage is small, the incremental change in current through the transistor will be approximately $$\Delta I(t)=g_m \Delta_{GS} \qquad \text{Equation 16}$$

Thus, if the change in $V_{GS}$ is an alpha function, then, to first order so will the change in I(t). Of course, since the current through the NMOS transistor is changing exponentially, because it is in subthreshold, this linearized model of the transistor is valid for only small changes in $V_{GS}$. While $V_{GS}$ may change enough to violate this, Equation 16 is still a good first order approximation of the change in current through the transistor. However, the inherit non-linearities of CMOS transistors limit the accuracy to which an alpha function time dependence can be approximated.

While in practice creating an impulse is impossible, a pulse of unit area and of short duration is mathematically equivalent to a unit impulse as long as the duration of the pulse is shorter than all characteristic time constants in the circuit. Thus, if the pre-synaptic were a short pulse, then the incremental change in $V_{GS}$ will be of the form of an alpha function.

The pre-synaptic input is, however, the neuron impulse, or action potential, of another neuron, as discussed above. If this action potential were buffered with a digital buffer, the output would be short, essentially constant valued pulse as desired.

One drawback to the present embodiment is that even when there is no pre-synaptic input, there is current that flows through the NMOS transistor. This arises from the fact there is a non-zero voltage on the capacitors 81, 82. This is because the output voltage of a simple transconductance amplifier in the follower configuration does not follow the input voltage when the input is zero. To minimize this problem, the simple transconductance amplifiers 78. 80 can be replaced by wide output range amplifiers, which are capable of providing output voltages closer to ground. Even in this case, there will be some current, albeit smaller, even when the input voltage is zero. This small amount of current can either be tolerated, or can be compensated by providing for an optional leakage transistor circuit 86. The bias voltage for the leakage can be determined by sensing circuitry or it may be externally set.

Figure 6C:
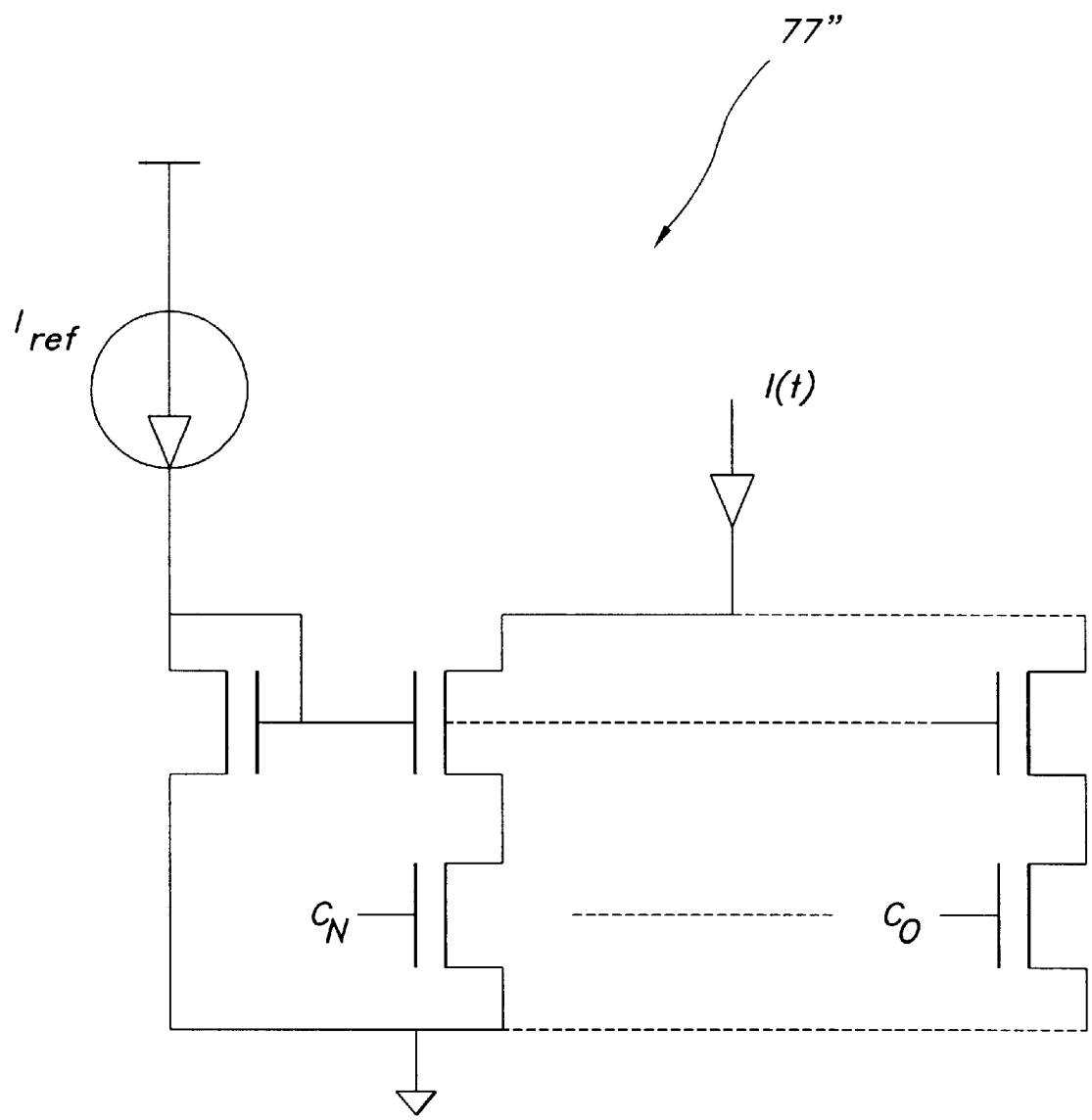
FIG. 6C is a block diagram of a time-varying current circuit.

Referring now to FIG. 6C, the time varying current I(t) function can also be provided by using a current mirror 77" similar to that used for the non-NMDA conductance. The circuit 77" includes a plurality of transistors 77a"–77N" each of which receives a respective one of control signals $C_0$–$C_N$. The value of the control signals $C_0$–$C_N$ determines which transistors are biased into conduction and non-conduction states and thus determines when each leg of the current mirror 69' conducts.

The size of the transistor in each successive leg 77a"–77N" is scaled by two to provide a binary implementation. The control signals $C_0$–$C_N$ inputs can then be controlled so that the total output current approximates an alpha function. The accuracy of this implementation is improved by adding more legs in the current mirror 77". One drawback of this circuit is the requirement of digital control logic to determine the control inputs. On the other hand, this implementation can potentially provide a very accurate approximation of an alpha function current, and no current flows when there is no input, unlike the use of follower integrators discussed above in conjunction with FIG. 6B.

If the alpha function time dependence is not critical, but rather the area under the alpha function (i.e. the total amount of charge), then the current I(t) can simply be provided as a constant-value pulse of current, which could also be implemented using the circuit 69' but with only one control input. It should be noted, however, that such an implementation would be a deviation from the concept of using life-like principles in design of the neuron circuits.

Figure 6D:
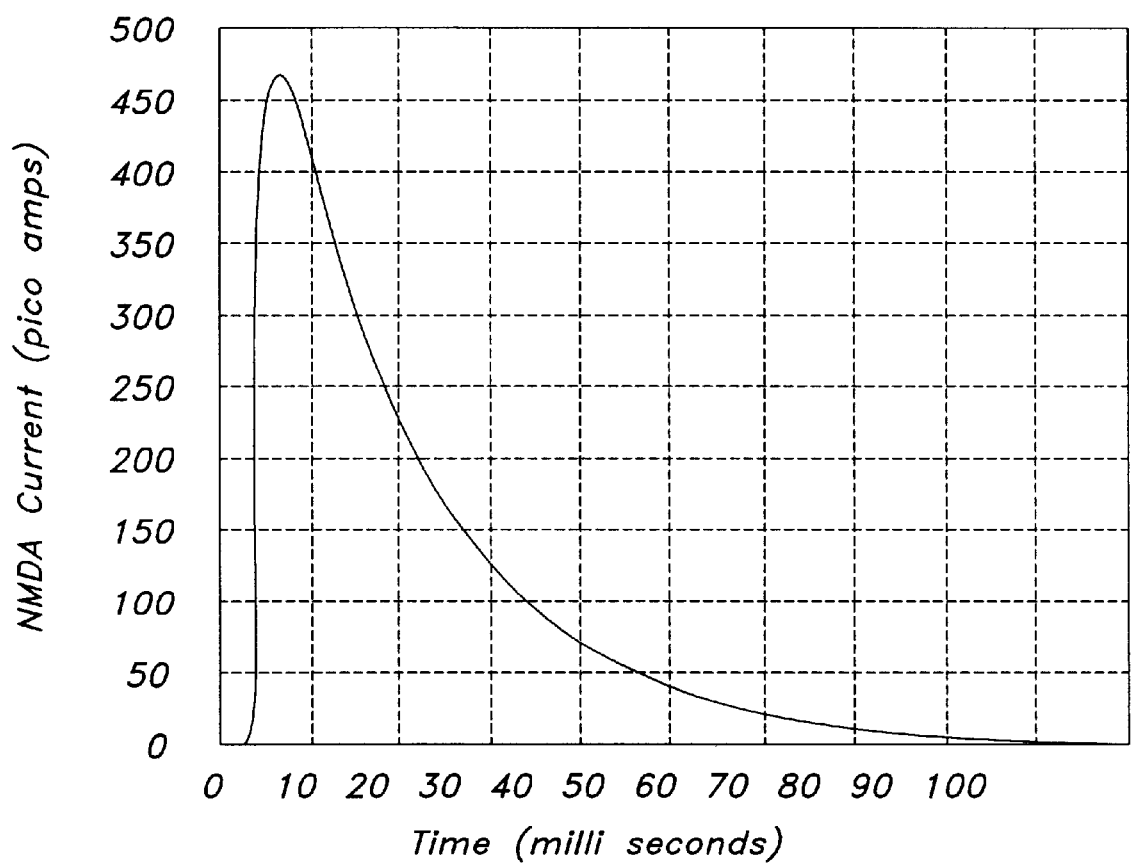
FIG. 6D is a plot of non-NMDA current in response to one pre-synaptic stimulus vs. time.

Referring now to FIG. 6D, a plot of NMDA current as a function of time following a single pre-synaptic stimulus is shown. As expected, the NMDA current approximates an alpha function.

Referring now to FIG. 7, an NMDA receptor channel circuit 36 is shown. As noted above in Equation 9, the conductance of the NMDA channel 36 not only varies with time, but also depends upon the spine head membrane voltage.

To implement this functional dependence on voltage, the NMDA circuit 36 includes a differential pair circuit 88. In operation, by selecting drain-to-source voltages having a predetermined voltage level, the currents $I_{1 diffpair}$ and $I_{2 diffpair}$ can be expressed as:

$$I_1 = k_x \frac{W_1}{L_1} e^{\frac{(v_1-v)}{nV_T}} \qquad \text{Equation 17}$$

$$I_2 = k_x \frac{W_2}{L_2} e^{\frac{(v_1-v)}{nV_T}} \qquad \text{Equation 18}$$

in which $I_1$ corresponds to $I_{1 diffpair}$ and $I_2$ corresponds to $I_{2 diffpair}$.

These sum of these two drain currents must be equal to the current $I(t)_{NMDA}$ through the bias transistor as shown. The current can be expressed as:

$$I_b = I_1 + I_2 = k_x e^{\frac{-v}{nV_T}} \left( \frac{W_1}{L_1} e^{\frac{v_1}{nV_T}} + \frac{W_2}{L_2} e^{\frac{v_2}{nV_T}} \right) \qquad \text{Equation 19}$$

in which the base current $I_b$ corresponds to the current $I(t)_{NMDA}$ and the node voltage $V_{DP}$ corresponds to V in Equation 19.

Solving Equation 19 for the node voltage and substituting into Equations 17 and 18 yields expressions for the currents $I_1$, $I_2$ corresponding to the currents $I_{1 diffpair}$, $I_{2 diffpair}$, respectively:

$$I_1 = I_b \frac{\frac{W_1}{L_1} e^{\frac{v_1}{nV_T}}}{\frac{W_1}{L_1} e^{\frac{v_1}{nV_T}} + \frac{W_2}{L_2} e^{\frac{v_2}{nV_T}}} \qquad \text{Equation 20}$$

-continued $$I_2 = I_b \frac{\frac{W_2}{L_2} e^{\frac{V_1}{nV_T}}}{\frac{W_1}{L_1} e^{\frac{V_1}{nV_T}} + \frac{W_2}{L_2} e^{\frac{V_2}{nV_T}}}$$

Equation 21

Essentially, if the signal voltage $V_{HEAD}$ is more positive than the voltage $V_{ref1}$ by multiple values of $nV_T$, the voltage $V_{DP}$ rises to turn transistor 88a off, so that all of the current goes through the transistor 88b and $I_{1diffpair} \approx I_{2diffpair}$. The analogous situation occurs when the voltage level of signal $V_{ref1}$ is more positive than the voltage level of $V_{head}$.

Coupled to the differential pair circuit 88 is a cascaded follower integrator circuit 90 provided from a pair of differential amplifiers 90a, 90b, a pair of capacitors C1, C2 and a transistor 90c coupled as shown. The cascaded follower integrator circuit 90 can be considered as voltage controlled resistors connected to capacitors to function as an RC delay line. The cascaded follower integrator circuit 90 receives a pre-synaptic input signal at a positive input terminal thereof. The pre-synaptic input signal may be digitized to an impulse signal. The cascaded follower integrator circuit 90 operates in a manner similar to that described above in conjunction with FIG. 6B to generate an alpha function from an action potential of another neuron. The alpha function provides a response described by $a_1 \exp[-t/\tau_1] - a_2 \exp[-t/\tau_2]$ where a1 and a2 are empirically selected values used to reflect that integrators in electronic circuits can be described using functions which include time and amplitude. It should be noted that, generally, an alpha function includes a single exponential with time modulation. It should thus be appreciated the alpha function described above using two terms may equivalently be expressed by a single term function or that other multiple term representations may also be used.

Applying and rearranging the Equation 20 to the differential pair 88 yields:

$$I_{diffpair} = I(t) \frac{1}{1 + Ze^{\frac{V_{Ref} - V_{Head}}{nV_T}}}$$

Equation 22 where Z is the ratio of the sizes of the transistors in the two legs of the differential pair.

$I_{diffpair}$ then serves as the bias current for a transconductance amplifier 91. Assuming the transconductance amplifier 91 operates in its linear range, the output current is given as:

$$I_{out-amp} = (V_{Head} - V_{Ref}) g_m = (V_{Head} - V_{Ref}) \frac{1}{2} \frac{I^{diffpair}}{nV_T}$$

Equation 23

This current is then mirrored (with appropriate scaling) through a PMOS current mirror 92 back to the spine head membrane and also to the calcium concentration circuit described above in conjunction with FIG. 3. It should be noted that current mirror 92 mirrors $I_{out-amp}$ twice instead of just once.

To maintain the proper exponential dependence on voltage in implementing Equation 4 with the NMDA circuit 34 which has a voltage dependence described by Equation 22, it is necessary to shift and scale the voltage ranges over which the circuits operate. Thus current mirror circuits 93, 94 provides a scaled down copy of the NMDA current $I_{out-amp}$ that charges/discharges the capacitor 71. As discussed above in conjunction with FIG. 6, when charged, the capacitor 71 holds a voltage $V_{HEAD}$ at the node 72. This technique represents a model in which a the flow of Ca2+ ions into the spine head is approximately proportional to the NMDA current. The current mirror 93 provides to a transconductance amplifier circuit 97 a current signal $I_{Ca2+}$ which corresponds to a scaled down version of the current signal $I_{out-amp}$.

The transconductance amplifier circuit 97 acts as a voltage controlled resistor having a resistance value set by the reference voltage $V_{LEAK}$. The capacitor 76 holds at a node 73 a voltage level $V_{CA2+}$ which is proportional the $Ca^{2+}$ ions within the spine head. The charge will dissipate from or "leak off of" node 99 until the voltage $V_{CA2+}$ falls to a value equal to $V_{REST}$. This is the mechanism by which transient pulses in the $CA^{2+}$ can return to nominal signal levels.

Typically, the spine head voltage varies between −80 mV and 0 mV[6]. For convenience, the biological 0 V is again chosen to be 2.5 V. Thus, typically there is a 2.5 V shift between an actual biological channel and the electronic implementation. The voltage range must also be scaled to maintain the same behavior in the exponential. From Equations 4 and 22, it is apparent that $$\gamma = \frac{1}{nV_T} x$$

Equation 24 where x is the ratio of the electronic implementation voltage to the actual biological voltage. For typical values of n, x should be approximately 2. In other words, while the biological voltage changes over a range of approximately 80 mV, the actual implementation will vary range of 160 mV. Formally, the voltages are related according to:

$$V_{electronic} = 2V_{biological} + 2.5V$$

Equation 25

Thus, the spine head voltage, in the electronic implementation, will vary from approximately 2.34 V to 2.5 V. This implies that the voltage signal $V_{Ref}$ in FIG. 7A should equal about 2.5 V. Also, since the differential input of the transconductance amplifier is potentially up to 160 mV, greater than the linear range of the simple transconductance amplifier, it is best to replace the simple transconductance amplifier with one with a wide input range. having a linear range of nearly 200 mV.

Examination of the voltage dependence of NMDA current produced by the NMDA circuit 36 reveals that for lower values of spine head voltage, corresponding to negative highly polarized values of biological potential, the magnesium ions block the NMDA channel and the current is small. As the spine head becomes depolarized (to a more positive potential), the NMDA channel conducts more. When the spine head voltage gets very close to its resting potential (biological=0 mV; electronic=2.5 V) very little currently flows because the voltage gradient is relatively small.

Figure 7A:
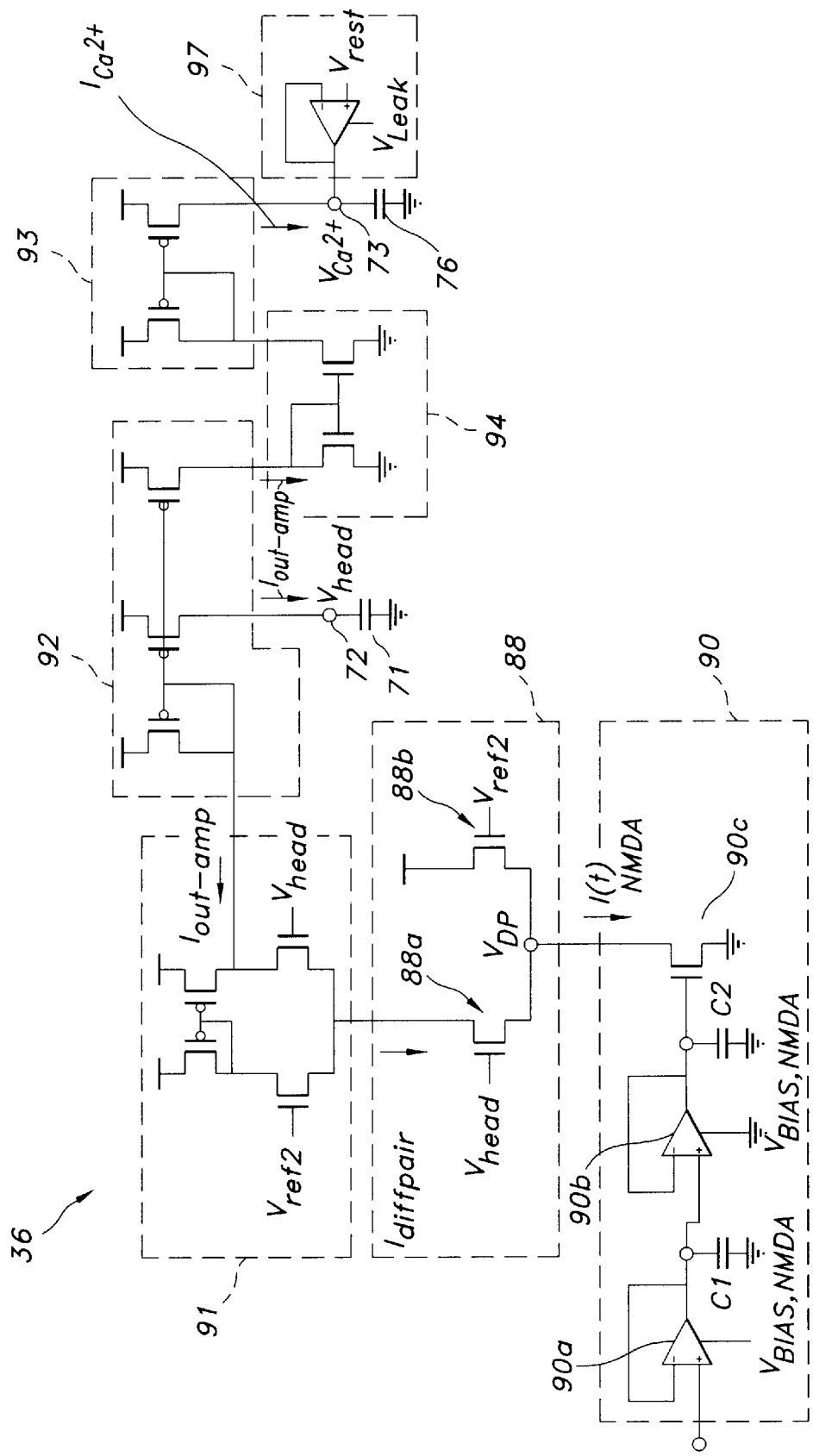
FIG. 7A is a block diagram of an NMDA receptor channel circuit.
Figure 7B:
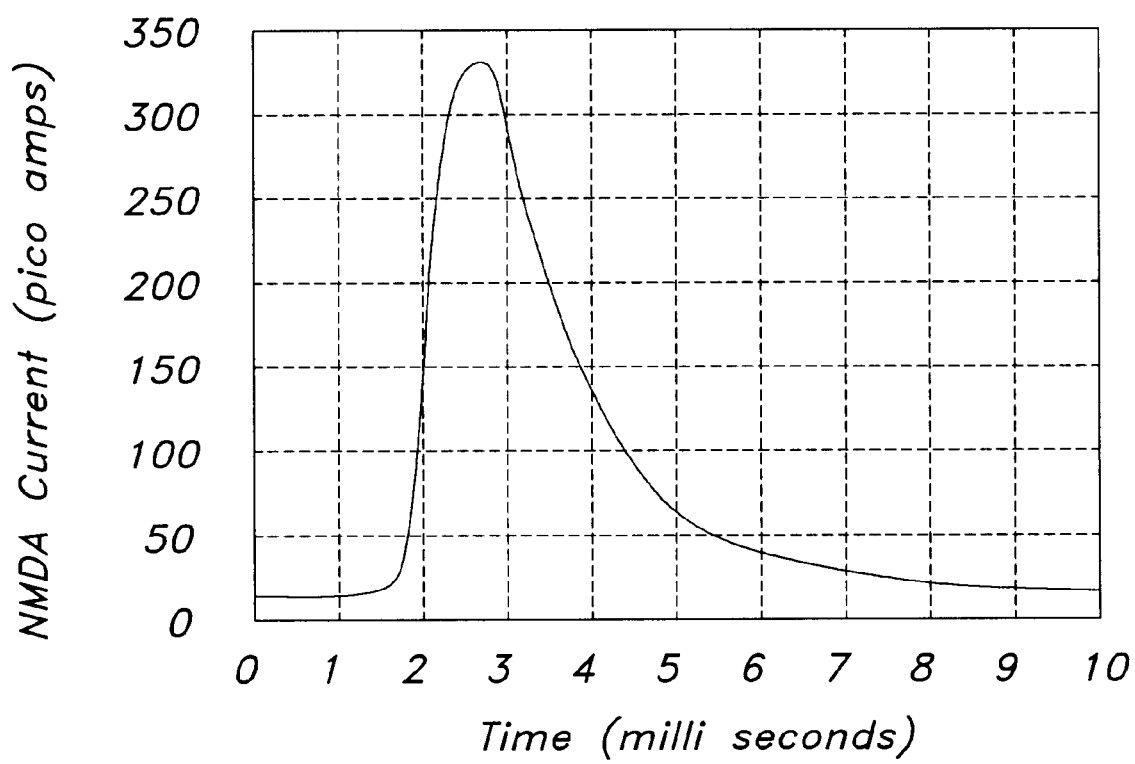
FIG. 7B is a plot of NMDA current in response to one pre-synaptic stimulus vs. time.

Referring now to FIG. 7B, a plot of non-NMDA current as a function of time following a single pre-synaptic stimulus is shown. As expected, the non-NMDA current approximates an alpha function with the peak value occurring at a time which is earlier than the time at which the peak value of the NMDA current occurs (FIG. 6D).

Figure 8:
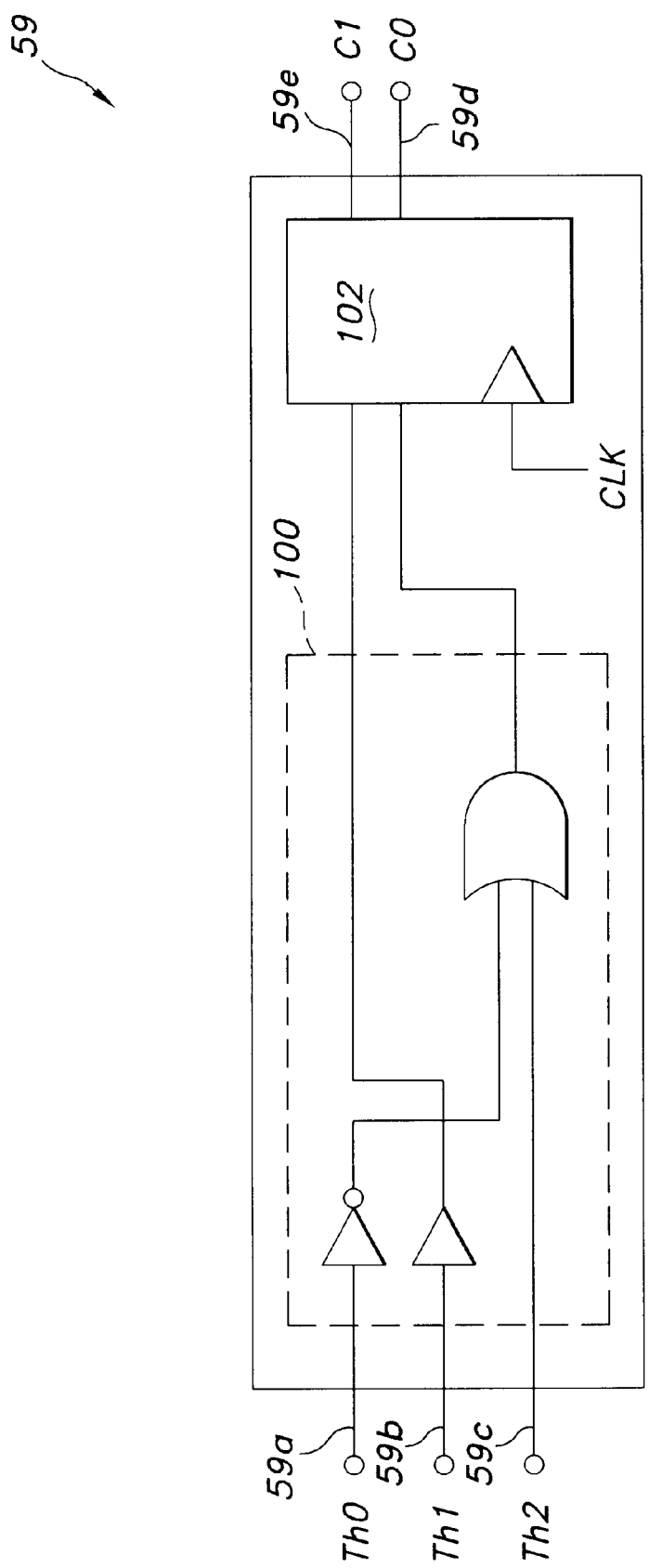
FIG. 8 is a block diagram of an LTP/LTD circuit.

Referring now to FIG. 8, a digital control circuit 59 for induction of LTP and LTD receives from a threshold circuit the threshold signals $TH_0$–$TH_2$ at respective ones of input ports 59a–59c and provides control signals $C_0$, $C_1$ having appropriate signal levels at output ports 59d, 59e. The threshold signals may be provided in any appropriate manner. For example, the threshold signals $TH_0$–$TH_2$ may be provided from any of the threshold circuits described above including those described in conjunction with FIGS. 1, 3, 5 and 6.

As discussed above, the induction of LTP is characterized by a prolonged increase in the conductance of the non-NMDA receptor channel, while the induction of LTD is characterized by the decrease in conductance of the non-NMDA receptor channel. This is achieved in the non-NMDA channel circuit 34 (FIG. 6) by the control signals $C_0$, $C_1$ turning on or off the legs of the conductance transistors 72 (FIG. 6). The digital control circuit 59 receives the threshold signals $TH_0$–$TH_2$ and determines the value of the control signals $C_0$, $C_1$ and thus determines the induction of LTP and LTD.

LTP and LTD are initiated when the concentration of $Ca^{2+}$ ions in the spine head reach certain levels. The circuitry discussed in calcium concentration measurement circuit 40 (FIG. 3) measures the concentration of $Ca^{2+}$ ions in the spine head and then determines when it has reached certain levels. The threshold circuit provides digital values signals which are used to determine the value of the control inputs, $C_1$ and $C_0$, in FIG. 6A Thus, the value of the non-NMDA conductance can range form its most depressed state, when $C_1 = C_0 = 0$, to its most potentiated state, when $C_1 = C_0 = 1$. The manner in which this is accomplished depends upon the type of algorithm for LTP/LTD that is being implemented.

One theory of the induction of LTP or LTD is that the conductance value of the non-NMDA current depends solely on the concentration of $Ca^{2+}$ ions, regardless of the initial conductance state. Under this theory, the changes in conductance values are triggered by crossing one of the thresholds, Th0–Th3. It should be noted that if none of the thresholds are crossed, then the conductance is in the nominal state. Depression of the conductance value is triggered only when the calcium concentration rises above the first threshold. This is because LTD can only be initiated when there is a stimulus (low-frequency). If there is no stimulus, there should be no reason for LTD (or LTP) to be initiated.

The truth table for this technique is shown in Table II. The signals $Th_0$–$Th_2$ correspond to the output signals of the threshold detection circuitry described above in conjunction with FIGS. 1–7C. With this particular technique, with only two control inputs $C_1$ and $C_0$, only three threshold values are necessary. It should be appreciated, however, that when more than two control input signals are provided an appropriate number of threshold values are used. Thus in any application, the number of threshold values used are dependent upon the number of control signals used and vice-versa.

Note that many of the rows of the truth table are "don't care." This is because the combinations of the signal Th2–Th0 in those rows are not possible, since the signals Th2–Th0 are correlated with one another. For instance, if the signal Th2=1, then that requires that Th1=1 and Th0=1.

TABLE II

| Th2 | Th1 | Th0 | C1 | C0 | Level of Potentiation |
|---|---|---|---|---|---|
| 0 | 0 | 0 | 0 | 1 | Normal |
| 0 | 0 | 1 | 0 | 0 | Depressed |
| 0 | 1 | 0 | * | * | Don't Care |
| 0 | 1 | 1 | 1 | 0 | Potentiated |
| 1 | 0 | 0 | * | * | Don't Care |
| 1 | 0 | 1 | * | * | Don't Care |
| 1 | 1 | 0 | * | * | Don't Care |
| 1 | 1 | 1 | 1 | 1 | Most Potentiated |

From this table, logic expressions for $C_1$ and $C_0$ can be derived in terms of $Th_2$–$Th_0$ as shown in Equations 26 and 27.

$$C1 = TH1 \cdot TH0 = TH1 \qquad \text{Equation 26}$$

$$C0 = \overline{Th2} \cdot \overline{Th1} \cdot \overline{Th0} + Th0 \cdot Th1 \cdot Th2 = \overline{Th0} + Th2. \qquad \text{Equation 27}$$

It should be noted that the control signals $C_1$, $C_0$ are not updated continuously in time, but rather at discrete intervals. In one embodiment, the duration of the time interval is the length of time for which LTP or LTD is in effect. This is accomplished via the digital circuits 100 included in the digital control circuit 59. The digital circuits 100 implemented the digital logic expressed by Equations 26, 27. It should be appreciated of course that any digital logic circuit capable of implementing the logic set forth in Equations 26, 27 could also be used.

Digital signals are fed from the output ports of the digital logic circuit 100 into a register circuit 102. Register circuit 102 provides control signals C0, C1 at the output ports 59*d*, 59*e* of the digital control circuit 59. The period of the clock signal for the register circuit 102 determines how long LTP or LTD is in effect.

Figure 9A:
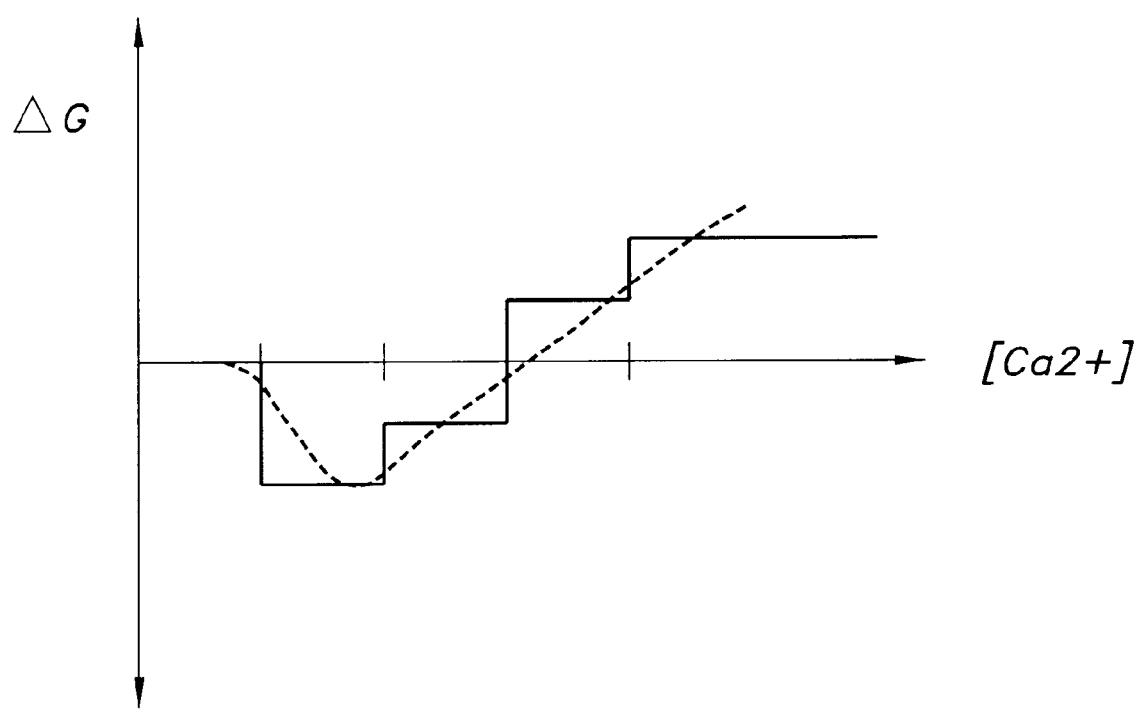
FIG. 9A is a plot of calcium level vs. gain in non-NMDA receptors.
Figure 9B:
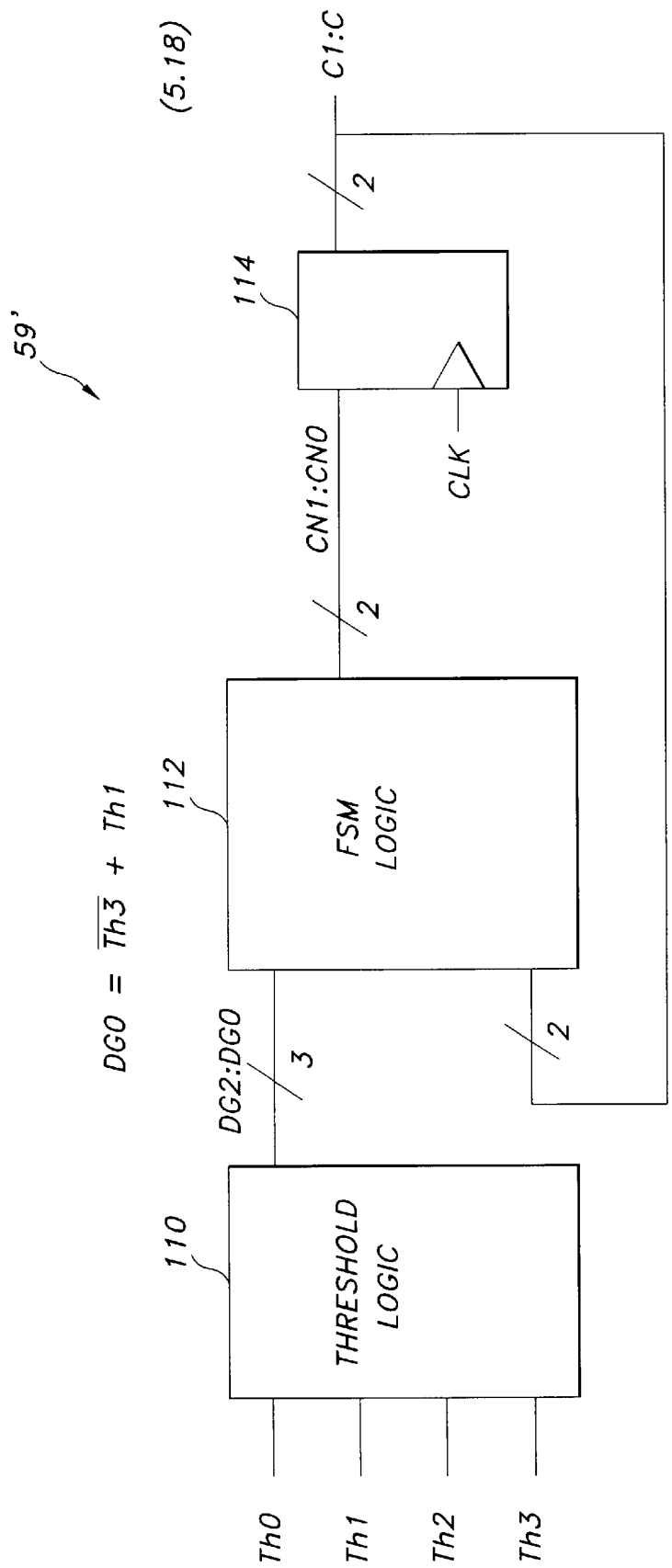
FIG. 9B is a block diagram of an LTP/LTD reversal circuit.

Referring now to FIGS. 9A and 9B, in FIG. 9A a plot illustrating the dependence of the change in conductance on the calcium concentration is shown. One theory of LTP and LTD is that they can reverse each other. In other words, the current conductance state depends upon the previous conductance state. If the non-NMDA conductance is initially in a potentiated state, and the calcium concentration dictates that LTD should be initiated, then the next conductance state would be a more nominal level, as opposed to fully depressed. With this technique, it is the change in conductance, rather than the actual conductance level, that is affected by the concentration of calcium ions and it is this dependence which is shown qualitatively in FIG. 9.

This can be expressed analytically as $$G[n+1] = G[n] + \Delta G \qquad \text{Equation 28}$$

where G[n] represents the current conductance state.

FIG. 9B is a block diagram of a circuit which implements the threshold logic of the LTP/LTD reversal algorithm. The four threshold outputs Th3–Th0 of FIG. 9B, can be represented by a two's complement three-bit number expressed as DG2–DG0. The truth table for the signals DG2–DG0 is shown in Table III.

TABLE III

| Th3 | Th2 | Th1 | Th0 | DG2 | DG1 | DG0 | Level of Potentiation |
|---|---|---|---|---|---|---|---|
| 0 | 0 | 0 | 0 | 0 | 0 | 0 | 0 |
| 0 | 0 | 0 | 1 | 1 | 1 | 0 | -2 |
| 0 | 0 | 1 | 1 | 1 | 0 | 1 | -1 |
| 0 | 1 | 1 | 1 | 0 | 0 | 1 | +1 |
| 1 | 1 | 1 | 1 | 0 | 1 | 0 | +2 |

The signals DG2–DG0 represents a change in C1–C0 ranging from −2 to +2. From this truth table, logic expressions for DG2–DG0 can be derived in terms of Th3–Th0 and expressed as:

$$G[n+1] = G[n] + \Delta G \qquad \text{Equation 29}$$

$$DG2 = \overline{Th2} \cdot Th0 \qquad \text{Equation 30}$$

$$DG0 = Th3 \text{ BAR} + Th1 \qquad \text{Equation 31}$$

The reversal circuit 59' implements the LTP/LTD reversal algorithm. Reversal circuit 59' includes as threshold logic circuit 110 which receives threshold signals TH0–TH3 and provides digital output signals DG0–DG2. The signals DG0–DG2 are fed to and FSM logic circuit 112. The output of the FSM logic circuit 112 is coupled to a register 114. The output of register 114 are the current conductance state control signals C1 and C0. The current conductance state control signals C1 and C0 coupled back to the input to the FSM logic circuit 112. When coupled in this manner, the output signals CN0–CN1 of the FSM logic circuit 112 correspond to the next control signals, CN1 and CN0 which are fed into the register circuit 114 which is clocked by a signal having a period which determines the length of LTP or LTD.

The truth table for the FSM logic circuit which calculates the signals CN1 and CN0 is shown in Table IV.
are shown in Table IV below.

TABLE IV

| C1 | C0 | DG2 | DG1 | DG0 | CN1 | CN0 |
|----|----|----|----|----|----|----|
| 0 | 0 | 0 | 0 | 0 | 0 | 0 |
| 0 | 0 | 0 | 0 | 1 | 0 | 1 |
| 0 | 0 | 1 | 0 | 1 | 0 | 0 |
| 0 | 0 | 1 | 1 | 0 | 0 | 0 |
| 0 | 0 | 0 | 1 | 0 | 1 | 0 |
| 0 | 1 | 0 | 0 | 0 | 0 | 1 |
| 0 | 1 | 0 | 0 | 1 | 1 | 0 |
| 0 | 1 | 1 | 0 | 1 | 0 | 0 |
| 0 | 1 | 1 | 1 | 0 | 0 | 0 |
| 0 | 1 | 0 | 1 | 0 | 1 | 1 |
| 1 | 0 | 0 | 0 | 0 | 1 | 0 |
| 1 | 0 | 0 | 0 | 1 | 1 | 1 |
| 1 | 0 | 1 | 0 | 1 | 0 | 1 |
| 1 | 0 | 1 | 1 | 0 | 0 | 0 |
| 1 | 0 | 0 | 1 | 0 | 1 | 1 |
| 1 | 1 | 0 | 0 | 0 | 1 | 1 |
| 1 | 1 | 0 | 0 | 1 | 1 | 1 |
| 1 | 1 | 1 | 0 | 1 | 1 | 0 |
| 1 | 1 | 1 | 1 | 0 | 0 | 1 |
| 1 | 1 | 0 | 1 | 0 | 1 | 1 |

From the Table IV truth table, logic expressions for CN1 and CN0 can be derived and may be expressed as:

$CN1 = C1 \cdot \overline{DG2} \cdot \overline{DG1} + C0 \cdot \overline{DG2} \cdot DG0 + DG$ $2 \cdot DG1 \cdot \overline{DG0} + C1 \cdot C0 \cdot DG2 \cdot DG0 =$ $\overline{DG2} \cdot (C1 \cdot \overline{DG1} + C0 \cdot DG0 + DG1 \cdot \overline{DG0}) + C1 \cdot$ $C0 \cdot DG2 \cdot DG0$ Equation 32

$CN0 = \overline{DG2} \cdot C1 \cdot C0 + \overline{C0} \cdot \overline{DG2} \cdot DG0 + C0 \cdot$ $\overline{DG2} \cdot \overline{DG1} \cdot \overline{DG0} + C1 \cdot C0 \cdot DG1 +$ $C1 \cdot \overline{DG2} \cdot DG1 + C0 \cdot \overline{DG2} \cdot DG1 + C1 \cdot \overline{C0} \cdot$ $DG2 \cdot DG0 =$
$(C1+C0) \cdot \overline{DG2} \cdot DG1 + C1 \cdot C0 \cdot (\overline{DG2}+DG1) +$
$C0 \cdot DG0 \cdot (C1+\overline{DG2}) + C0 \cdot \overline{DG2} \cdot \overline{DG1} \cdot$ $\overline{DG0}$ Equation 33

Figure 10A:
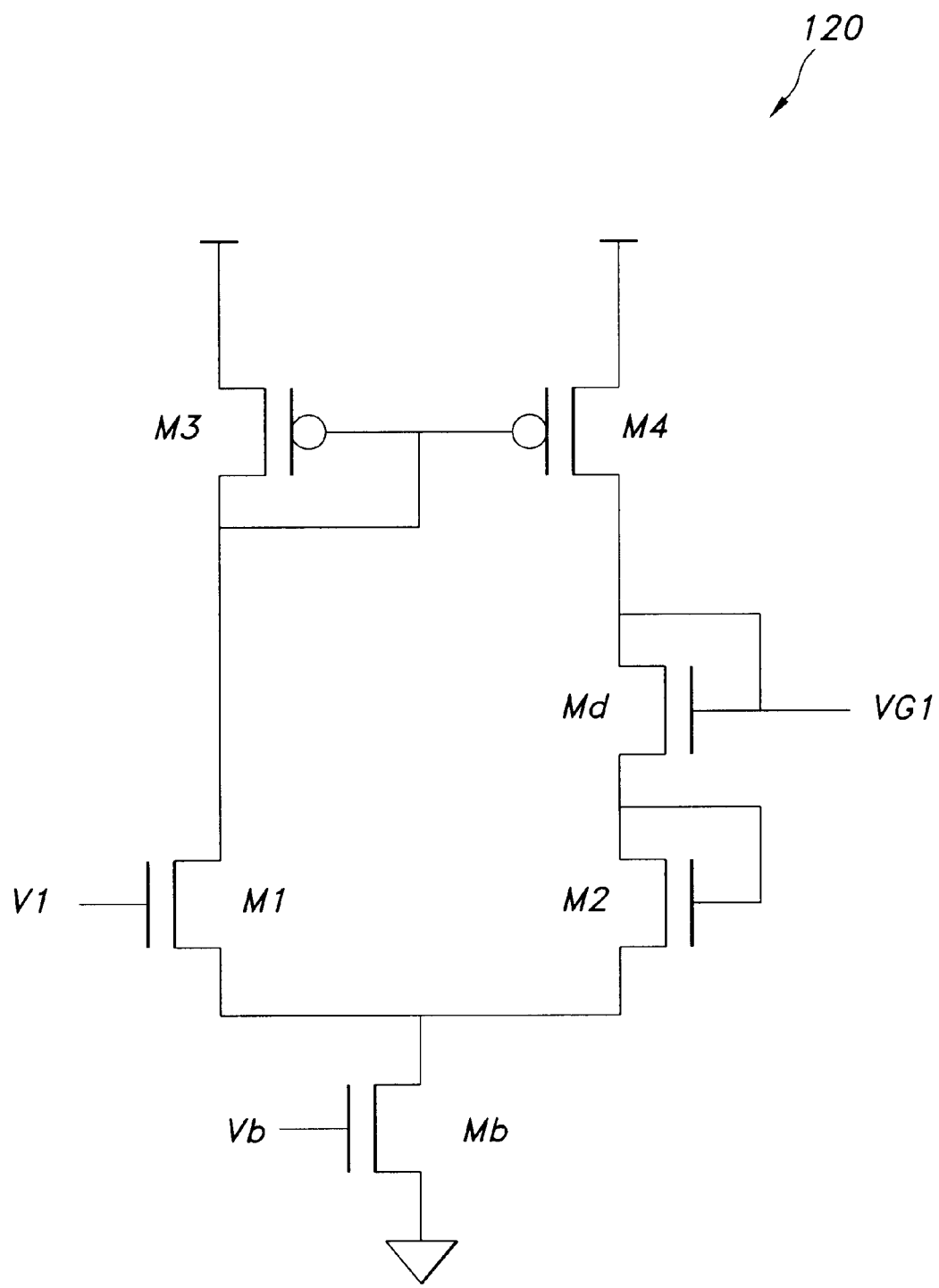
FIG. 10A is a block diagram of a bias circuit.

Referring now to FIG. 10, a bias circuit which produces bias voltages at the gates of the pass transistors of the horizontal circuit. The bias circuitry must adjust the gate voltage such that $V_q$ defined in Equation 34 is held constant even when the node voltages $V_1$ and $V_2$ change. FIG. 10A illustrates this function for the signal voltage VG1. An identical circuit with V2 as the input generates the signal voltage VG2.

$V_q = V_{G1} - V_1 = V_{G2} - V_2$ Equation 34

The horizontal resistor bias circuit is essentially a transconductance amplifier connected in the follower configuration, with the addition of the diode connected transistor Md. The gate voltage of transistor M2 follows the voltage V1. The voltage VG1 is thus equal to the voltage V1 plus an offset equal to the voltage across the diode connected transistor Md. This offset is the voltage required to maintain the current through transistor Md, which is half of the bias current Ib. By Equation 34, this offset is in fact equal to $V_q$. The current through transistor Md can be expressed as:

$$\frac{I_b}{2} = I_0 e^{\frac{V_{G1}-V_1}{nV_T}} = I_0 e^{\frac{V_q}{nV_T}}$$ Equation 35

The dependence on the drain voltage in Equation 6 is negligible since the transistor is diode connected. Hence, Equation 35 relates $V_q$ to the bias current $I_b$. That is, setting the gate voltage of the bias transistor Mb determines the signal voltage $V_q$, independent of $V_1$ or $V_2$. This in turn determines the resistance of the horizontal resistor connection. An expression for the effective resistance of the connection that is solely dependent on $I_b$ and the thermal voltage may thus be written as:

$R = 4nV_T/I_b$ Equation 36

Since the current $I_b$ depends exponentially on the gate voltage of the transistor Mb, the effective resistance of the horizontal resistor connection can vary over many orders of magnitude. In operation, as the bias voltage increases, more current flows, corresponding to a decrease in effective resistance.

Examination of the current I of the horizontal resistor configuration as a function of $V_1-V_2$ reveals that for values of $V_1-V_2$ less than approximately 100 millivolts, the slope of the curve is relatively constant, corresponding to a constant effective resistance given by Equation 36. For values of $V_1-V_2$ greater than 100 millivolts in magnitude, the current saturates, and the circuit loses its linear resistive behavior.

This 100 millivolt linear range of the horizontal resistor configuration may not be enough in certain applications. However, multiple horizontal resistor circuits can be placed in series to increase the range over which the circuits behave like a constant resistance.

The horizontal resistor circuit is a practical and flexible way to implement the dendritic resistance of then neuron. A single connection may suffice, although multiple circuits may be cascaded to increase the linear resistive range. However, this may not be necessary since the spine head voltage and the neuron cell voltage do not differ much in voltage, except at the instance of an action potential, which is of relative short duration. Thus the saturation of the resistor current at this time may be within an acceptable tolerance range.

Figure 10B:
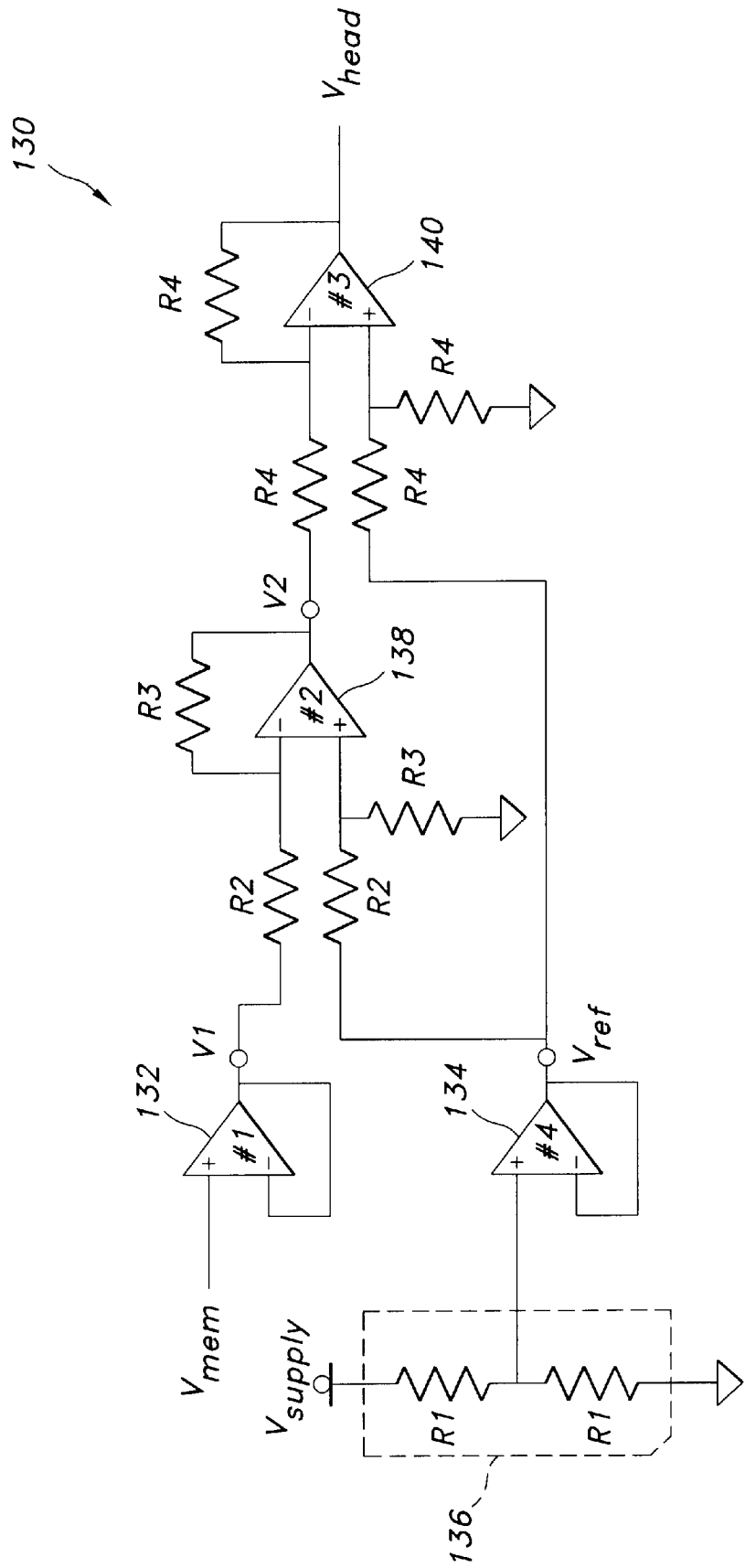
FIG. 10B is a schematic diagram of a scaling circuit.

Referring now to FIG. 10B, a scaling circuit 130 includes a first operational amplifier (op-amp) 132 connected in the unity buffer configuration and having a first input signal $V_{mem}$ coupled to the positive input of op-amp 132 and having a second input voltage $V_{HEADOUT}$ set equal to the output voltage $V_1$ coupled to the negative input terminal of op-amp 132. The buffer configuration is used so that the scaling circuit 130 does not load the other circuitry and draw current from it.

A second op-amp 134 is also connected in the unity buffer configuration. Its input voltage is one half of the power supply voltage, created by the resistive divider network 136 provided from resistors R1. The op-amp 134 generates a reference voltage $V_{ref}$ at the output port thereof When the supply voltage Vsupply is set equal to 5 volt, for example, the signal voltage $V_{ref}$ equals 2.5 volts.

The op-amps 138, 140 are each connected in the differential amplifier configuration. The output voltage of op-amp 138 is provided as:

$$V_2 = R^2/R_1(V_{Ref} - V_1) = R_2/R_1(V_{Ref} - V_{Headout}) \quad \text{Equation 37}$$

while the output voltage of op-amp 140 is similarly provided as:

$$V_{HEADIN} = V_{Ref} - V_2 = V_{Ref} - \frac{R_2}{R_1}(V_{Ref} - V_{HEADOUT}) \quad \text{Equation 38}$$

It should be appreciated that although amplifiers 132–138 are here shown as operational amplifiers, any amplifier having a relatively large gain and a relatively small output resistance (e.g. a MOS amplifier) can also be used. It should also be appreciated that it may be desirable to fabricate the scaling circuit 130 as a portion of an integrated circuit. In some applications, however, the scaling circuit may be implemented using discrete, off-chip, components.

The dendritic circuit connects the neuron membrane circuits to the spine head or synaptic circuits discussed above. However, these two different groups of circuits operate over different voltages ranges. Both voltage ranges possess the same ground, or reference, voltage, equal to 2.5 volts. However, the neuron membrane circuits operate over a range that is five times as big as the range for the spine head circuits. Recall that this difference in voltage scale resulted from the different exponential dependence on voltage that the two different types of circuits exhibited. Since the neuron membrane circuits are connected to the spine head circuits through the dendritic resistance, this difference in voltage scales is a problem.

However, it should be noted that the spine head node in the circuits in FIG. 5 are connected to the gates and drains of the transistors and that such connections to the transistor gates are essentially the inputs of the circuit, while the connections at the transistors drain serve as the outputs. Consequently, these output signals essentially behave like current sources. That is; the output current is negligibly affected by the head voltage at these drain connections. Thus, at the drain connections, the voltage scale does not really matter and can therefore be on the same scale as neuron cell membrane circuit.

The spine head input connections at the transistor gates must be on the voltage scale given by Equation 25 for the spin head circuits. FIGS. 6A and 7A show the NMDA and non-NMDA circuits with the input spine head nodes (HEADIN) and the output nodes (HEADOUT).

The HEADOUT node can be connected to one end on the horizontal resistor network, with the other end connected to the neuron cell membrane. The HEADIN voltage must be scaled version of the HEADOUT voltage to achieve the necessary voltage scale. In particular HEADIN must be related to HEADOUT according to $$V_{HEADIN} = V_{Ref} - \frac{1}{5}(V_{Ref} - V_{HEADOUT}) \quad \text{Equation 39}$$

where $V_{Ref}$ is equal to 2.5 volts. This behavior can be implemented by using the scaling circuit 130 circuit 130.

Having described preferred embodiments of the invention, it will now become apparent to one of ordinary skill in the art that other embodiments incorporating their concepts may be used. For example, hardware simulations of small neural networks using a functioning fabricated device can be performed and a biological neural network can be emulated. Also, experiments based on physiological principles can be performed to test different learning algorithms.

At the transistor level, circuits can be designed to generate many of the voltage references that are needed. While some of these references are intended to be variable, in certain cases it may be desired that they are fixed. Also, circuits can be developed to emulate different types of synapses, and different learning techniques, including first in building an artificial neural network that emulate the analog behavior or real neurons.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A calcium concentration circuit comprising:

means for receiving signals from a non-NMDA receptor channel circuit and an NMDA receptor channel circuit;

means for measuring a net charge over time flowing through the NMDA receptor channel circuit; and a temporary storage and buffer circuit for accumulating the net charge over time flowing through the NMDA receptor channel circuit.

2. The circuit of claim 1 wherein said temporary storage and buffer circuit comprises a capacitor and wherein said current is accumulated in said capacitor such that said capacitor has a voltage which is proportional to the charge.

3. The circuit of claim 1 further comprising:

means for scaling the current flowing through the NMDA receptor channel circuit; and means for accumulating a scaled copy of the NMDA current onto the capacitor such that the voltage on the capacitor represents a concentration of $Ca^{2+}$ ions.

4. The circuit of claim 3 wherein said means for scaling is provided by a current mirror circuit including a PMOS current mirror.

5. The circuit of claim 3 further comprising a transconductance amplifier connected in the follower configuration, said transconductance amplifier having an output connected to one terminal of said capacitor to provide a leakage current having a time constant determined by a conductance value $g_m$ of the amplifier and the capacitance of the capacitor and wherein a voltage $V_{Rest}$ applied to said amplifier determines the resting level of the capacitor voltage when there is not current flowing onto it.

6. The circuit of claim 1 wherein said temporary storage and buffer circuit comprises:

an amplifier; and a capacitor having a first terminal coupled to an output terminal of said amplifier and to a first terminal of said temporary storage and buffer circuit and having a second terminal coupled to a first reference potential.

7. The integrated circuit of claim 1 further comprising a threshold detection circuit, said threshold detection circuit comprising:

first means for providing a plurality of reference voltages; and second means, coupled to said first means, for receiving an input voltage and for comparing the input voltage to each of said plurality of reference voltages and for providing an output voltage in response to said comparison.

8. The integrated circuit of claim 1 wherein:

said first means comprises a resistive bridge; and said second means comprises a plurality of threshold detection circuits.

9. The integrated circuit of claim 1 wherein said threshold detection circuit comprises a digital buffer which compares an input signal to a reference voltage and provides a corresponding output signal in response to the input signal.

10. The circuit of claim 1 further comprising a first control circuit wherein said first control circuit comprises a plurality of digital logic circuits which receive input signals from said threshold circuit and provide output control signals to said non-NMDA receptor channel circuit to provide said non-NMDA circuit having a conductance representative of the induction of LTP or LTD.

11. The circuit of claim 7 further comprising a second control circuit wherein said second control circuit comprises a plurality of digital logic circuits which receive input signals from said threshold circuit and provide output control signals to said non-NMDA receptor channel circuit to provide said non-NMDA circuit having a conductance representative of the ability of LTP and LTD to reverse each other.

12. A non-NMDA receptor channel circuit comprising:

a transconductance amplifier;

a current mirror coupled to said transconductance amplifier; and a conductance circuit coupled to said current mirror.

13. The non-NMDA receptor channel circuit of claim 12 wherein said transconductance amplifier comprises a time varying current circuit.

14. An NMDA receptor channel circuit having first and second terminals, said NMDA receptor channel circuit comprising:

a first current mirror;

a second current mirror coupled to said first current mirror;

a first differential pair coupled to said first and second current mirrors, said first differential pair having a first terminal coupled to the first terminal of the NMDA receptor channel circuit and having a second terminal coupled to the second terminal of the NMDA receptor channel circuit;

a second differential pair coupled to said first differential pair, said second differential pair a first terminal coupled to the first terminal of the NMDA receptor channel circuit and having a second terminal coupled to the second terminal of the NMDA receptor channel circuit; and a time varying current circuit coupled to said second differential pair.

\* \* \* \* \*